United States Patent
Osinga et al.

(10) Patent No.: US 8,825,776 B1
(45) Date of Patent: Sep. 2, 2014

(54) GENERATING A HOSTED CONVERSATION IN ACCORDANCE WITH PREDEFINED PARAMETERS

(75) Inventors: Douwe M. Osinga, Berlin (DE); Dhananjay R. Prasanna, Sydney (AU); Ofir Davidovich, McMahons Point (AU)

(73) Assignee: Google Inc., Mountain View, CA (US)

( * ) Notice: Subject to any disclaimer, the term of this patent is extended or adjusted under 35 U.S.C. 154(b) by 180 days.

(21) Appl. No.: 13/109,929

(22) Filed: May 17, 2011

Related U.S. Application Data

(60) Provisional application No. 61/475,610, filed on Apr. 14, 2011, provisional application No. 61/345,993, filed on May 18, 2010.

(51) Int. Cl.
*G06F 15/16* (2006.01)
(52) U.S. Cl.
USPC ............ 709/206; 709/204; 709/205; 709/207
(58) Field of Classification Search
USPC .................................. 709/201–207, 217–219
See application file for complete search history.

(56) References Cited

U.S. PATENT DOCUMENTS

| | | | |
|---|---|---|---|
| 7,222,156 B2 | 5/2007 | Gupta et al. | 709/206 |
| 2002/0133611 A1* | 9/2002 | Gorsuch et al. | 709/231 |
| 2005/0234850 A1* | 10/2005 | Buchheit et al. | 707/1 |
| 2009/0144392 A1* | 6/2009 | Wang et al. | 709/217 |
| 2009/0187825 A1* | 7/2009 | Sandquist et al. | 715/719 |
| 2009/0265607 A1* | 10/2009 | Raz et al. | 715/233 |
| 2010/0088372 A1* | 4/2010 | Shridhar et al. | 709/204 |
| 2010/0241968 A1* | 9/2010 | Tarara et al. | 715/751 |

* cited by examiner

*Primary Examiner* — Awet Haile
*Assistant Examiner* — Eric Myers
(74) *Attorney, Agent, or Firm* — Patent Law Works LLP

(57) ABSTRACT

A conversation server having one or more processors and memory receives, from a client, a request to generate a hosted conversation in accordance with a set of predefined parameters. The client has a user with a communications account associated with the conversation server. The set of predefined parameters is specified by a webpage that is not associated with the communications account. In response to the request, the conversation server generates a respective hosted conversation in accordance with the set of predefined parameters. The respective hosted conversation is hosted by the conversation server and has a plurality of participants including the user and an additional participant specified by the predefined parameters.

20 Claims, 22 Drawing Sheets

GENERATING A HOSTED CONVERSATION IN ACCORDANCE WITH PREDEFINED PARAMETERS

RELATED APPLICATIONS

This application claims priority to U.S. Provisional Patent Application Nos. 61/475,610, filed Apr. 14, 2011, entitled "Generating a Hosted Conversation in Accordance with Predefined Parameters/Generating a Conversation Associated with a Webpage," and 61/345,993, filed May 18, 2010 entitled "Sharing Hosted Conversations," which are incorporated herein by reference in their entirety.

TECHNICAL FIELD

The disclosed embodiments relate generally to communication systems. More particularly, the disclosed embodiments relate to methods and systems, and user interfaces for enabling automated participants to participate in a communication system.

BACKGROUND

A variety of electronic communications systems, including electronic email ("email") systems and instant messaging (IM) system are well known. In some conventional electronic communication systems users navigating through webpages are able to interact with the webpages using the electronic communication systems. As one example, some webpages allow a user to email information about the webpage to other users. However, such conventional electronic communication systems restrict interaction with the webpages in a number of ways. In particular, the information about a webpage in the email may become outdated when the webpage is updated, and conventional electronic communication systems have no way to retroactively update information about the webpage if the webpage is updated, which may lead to inaccurate conversations about outdated webpage information. These limitations of conventional electronic communications systems provide users with relatively limited options for interacting with the electronic communications and prevent or impede users from performing a number of operations associated with the electronic communications, thereby reducing the usability of conventional electronic communications systems.

SUMMARY

Therefore, it would be advantageous to provide a system and method for enabling a hosted conversation to be automatically generated in accordance with a set of predefined parameters. It would also be advantageous to provide a system and method for enabling generation of a conversation associated with a webpage in an intuitive and efficient manner. In particular, in accordance with some of the disclosed embodiments, hosted conversations are generated for particular webpages and/or are generated in accordance with predefined parameters, thereby providing substantial added value to electronic communication systems. Thus, the problems with conventional electronic communication systems described above are reduced or eliminated by the systems and methods described below.

In accordance with some embodiments, a method is performed at a server system having one or more processors and memory storing one or more programs for execution by the one or more processors so as to perform the method. The method includes: receiving, from a client, a request to generate a hosted conversation in accordance with a set of predefined parameters. The client has a user with a communications account associated with the conversation server. The set of predefined parameters is specified by a webpage that is not associated with the communications account. The method further includes, in response to the request, generating a respective hosted conversation in accordance with the set of predefined parameters. The respective hosted conversation is hosted by the conversation server and has a plurality of participants including the user and an additional participant specified by the predefined parameters.

In accordance with some embodiments, a method is performed at a server system having one or more processors and memory storing one or more programs for execution by the one or more processors so as to perform the method. The method includes: While there is no hosted conversation associated with a first webpage, receiving a first request from a first client for a hosted conversation associated with the first webpage; and in response to the first request: generating a first conversation that is associated with the first webpage; and sending information to the first client enabling the first conversation to be displayed as an element embedded in the first webpage. The method further includes, after the first hosted conversation has been generated, receiving from a second client a second request for a hosted conversation associated with the first webpage, and in response to the second request, sending information to the second client enabling the first hosted conversation to be displayed as an element embedded in the first webpage.

In accordance with some embodiments, a method is performed at a client having one or more processors and memory storing one or more programs for execution by the one or more processors so as to perform the method. The method includes: rendering a first webpage for a first time, where the rendering includes executing a first set of rendering instructions that include sending to a conversation server a first request for a conversation associated with the first webpage; and receiving, in response to the first request, information enabling the first conversation to be displayed as an element embedded in the first webpage, where the first conversation is a newly initialized conversation when the first webpage is rendered the first time. The method further includes, after rendering the first webpage for the first time, rendering the first webpage for a second time. The rendering includes executing the first set of rendering instructions that include sending to the conversation server a second request for a conversation associated with the first webpage. The method also includes, receiving, in response to the second request, information enabling the first conversation to be displayed as an element embedded in the first webpage, where the first conversation includes participant generated content when the first webpage is rendered for the second time.

In accordance with some embodiments, a computer system (e.g., a client system or device, conversation server, automated participant server, etc.) includes one or more processors, memory, and one or more programs; the one or more programs are stored in the memory and configured to be executed by the one or more processors and the one or more programs include instructions for performing the operations of one or more of the methods described above. In accordance with some embodiments, a non-transitory computer readable storage medium has stored therein instructions which when executed by one or more processors, cause a computer system (e.g., a client, conversation server, automated participant server, etc.) to perform the operations of one or more of the methods described above.

BRIEF DESCRIPTION OF THE DRAWINGS

Various embodiments of the invention are disclosed in the following Description of Embodiments herein, in conjunction with the following drawings in which like reference numerals refer to corresponding parts throughout the figures.

DESCRIPTION OF EMBODIMENTS

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the scope of the invention to these particular embodiments. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention can be practiced without these particular details. In other instances, methods, procedures, components, and networks that are well known to those of ordinary skill in the art are not described in detail to avoid obscuring relevant aspects of the disclosed embodiments.

Figure 1:
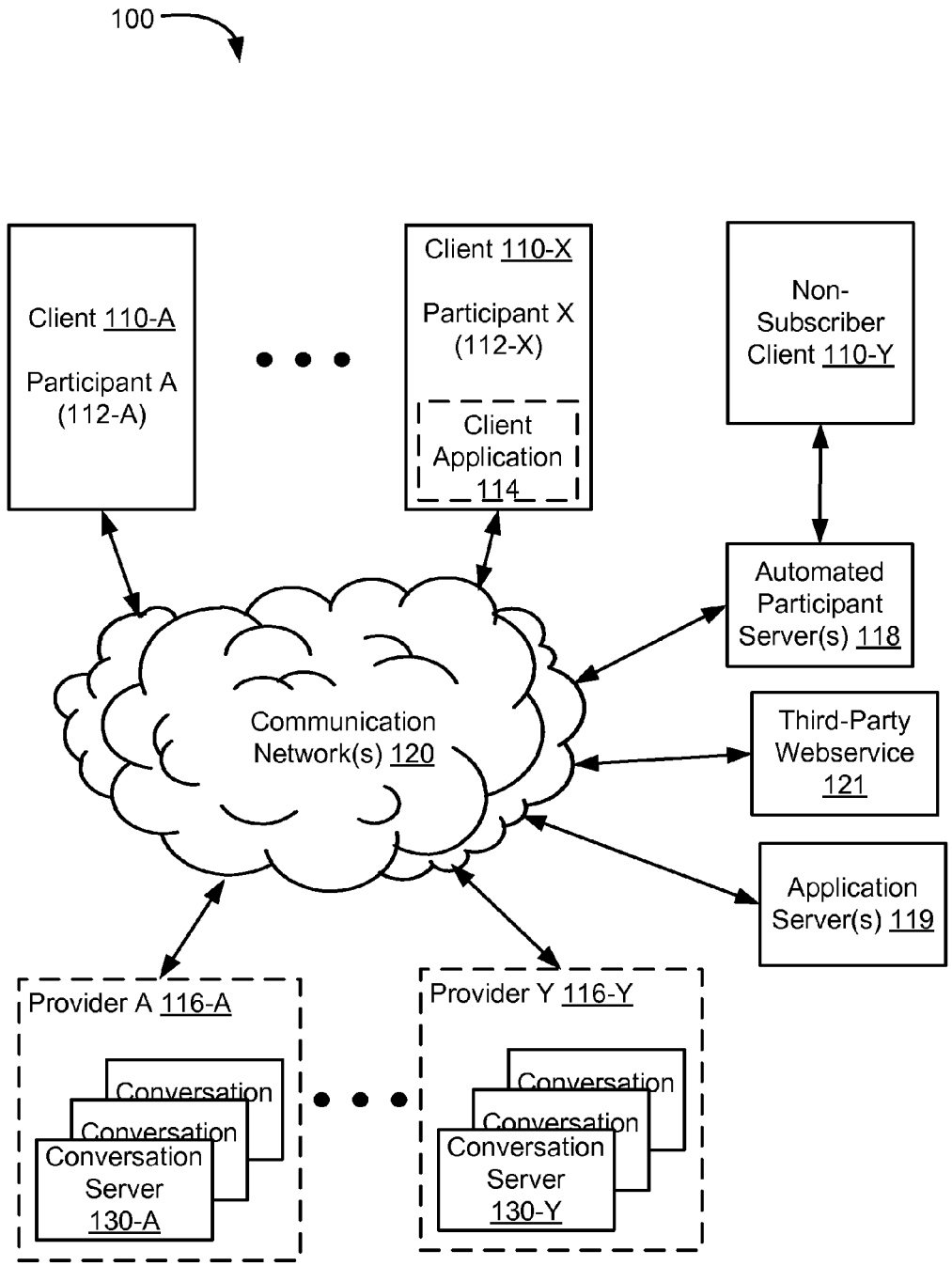
FIG. 1 is a block diagram illustrating an exemplary distributed computer system according to certain embodiments.

FIG. 1 is block diagram illustrating an exemplary distributed computer system 100 according to certain embodiments. Distributed computer system 100 includes a plurality of clients 110. Users of clients 110 (also herein called client devices, client systems or client computers) are participants 112 in conversations hosted by a set of conversation servers 130 (sometimes called a conversation server system). Sometimes these conversations (conversations hosted by a set of conversation servers) are called "hosted conversations." Clients 110 can be any of a number of computing devices (e.g., Internet kiosk, personal digital assistant, cell phone, gaming device, desktop computer, laptop computer, handheld computer, tablet computer, or combinations thereof) used to enable the activities described below. Each client 110 is coupled to a network 120, which can be any of a number of networks (e.g. Internet, intranet, local area network, wide area network, wireless network, wired network, optical network, or a combination of such networks). More generally, clients 110 and conversation servers 130 are coupled to each other via one or more communication networks 120.

Additionally, various other servers may be a part of the distributed computer system 100. In some embodiments, the distributed computer system 100 includes an automated participant server 118 that communicates with conversation server(s) 130 and clients 110 via communication network 120, so as to participate in conversations. In some embodiments, automated participant server 118 is a third-party server (e.g., a server which is owned, and/or operated by a party other than: the party that owns and/or operates conversation server 130 and the party that owns and/or operates client 110.) However, automated participant server 118 can also be a pseudo third-party server, which is owned and/or operated by the same party that owns and/or operates conversation server 130, but that is not integrated into the conversation system. For example, an operator of a conversation system could provide one or more automated participant servers that are available for third parties to host automated participant code so as to ensure that the code is readily available without substantively controlling the content of the automated participant code. It should be understood that in other embodiments, the content of the automated participant code is only constrained by a predefined set of guidelines (e.g., guidelines intended to prohibit malicious behavior) but is otherwise not controlled by the operator of the conversation system. In most implementations, however, automated participant server 118 is distinct from conversation server 130.

In some embodiments, distributed computer system 100 also includes a third-party webservice 121 that communicates with automated participant server(s) 118 and clients 110 via communication network 120. Users of the third-party webservice may indirectly participate in conversations hosted by conversation servers 130 via the automated participant server(s) 118 as described in greater detail below. In some embodiments, a third-party webservice 121 is hosted at a server system which is owned, and/or operated by a party other than: the party that owns and/or operates conversation server 130, the party that owns and/or operates client 110, and the party that owns and/or operates application server 118. However, third-party webservice 121 can also be hosted at a pseudo third-party server, which is owned and/or operated by the same party that owns and/or operates conversation server 130, but that is not integrated into the conversation system. Third-party webservices may include virtually any web-based service that includes user generated content (e.g., text, images, video, audio), such as one or more of: video sharing services (e.g., YouTube®), blogging services (e.g., Blogger®), social media services (e.g., Buzz®, Facebook®, Twitter®, etc.), online retail services (e.g., Google Checkout®, Amazon.com®, eBay®, etc.), or any other service that enables users to post comments, content or reviews.

Additionally, a third-party webservice 121 may host a website or webpage that includes an element (e.g., a button or other selectable user interface object, sometimes called an affordance) that enables a client that is displaying the webpage to send a request to a conversation server to generate a hosted conversation in accordance with a set of predefined parameters specified by the webpage, as described in greater detail below with reference to method 1100, see FIGS. 11A-11B. A third-party webservice 121 may also host a website or webpage that includes rendering instructions for rendering a conversation as an embedded element within the webpage, as described in greater detail below with reference to method 1200, see FIGS. 12A-12D.

In some embodiments, the distributed computer system 100 includes an application server 119 that communicates with conversation server(s) 130 and clients 110 via communication network 120, so as to provide code enabling embedded applications to be inserted into conversations. In some embodiments, application server 119 is a third-party server, which is owned, and/or operated by a party other than: the party that owns and/or operates conversation server 130 and the party that owns/operates client 110. However, application server 119 can also be a pseudo third-party server, which is owned and/or operated by the same party that owns and/or operates conversation server 130, but that is not integrated into the conversation system. For example, an operator of a conversation system could provide one or more servers that are available for third parties to host embedded application code so as to ensure that the code is readily available without substantively controlling the content of the embedded applications. It should be understood that in other embodiments, the content of the embedded applications is only constrained by a predefined set of guidelines (e.g., guidelines intended to prohibit malicious behavior) but is otherwise not controlled by the operator of the conversation system. In most implementations, however, application server 119 is distinct from conversation server 130.

A respective client (e.g., 110-A) executes a client application 114 that facilitates access from client 110 to a respective conversation server (e.g., 130-A). Client application 114 may include a graphical user interface. For example, client application 114 may be a web browser or other browser application, such as Firefox® (trademark of Mozilla Foundation), Internet Explorer® (trademark of Microsoft Corporation), Safari® (trademark of Apple Inc.), or Chrome® (trademark of Google Inc.).

While a conversation system (e.g., a hosted conversation system with a shared communication protocol that enables different conversation servers to communicate with each other and users who have communications accounts with one conversation server to interact with users who have communications accounts with another conversation server) may have a single conversation server 130, in other embodiments the conversation system may have multiple conversation servers 130. For example, multiple conversation servers 130-A and 130-Y may be hosted by different service providers, such as providers 116-A and 116-Y respectively. In some embodiments, the providers are internet service providers (ISPs) providing a conversation service. Alternately, some or all of the providers may be dedicated conversation providers. When conversation system includes multiple conversation servers 130, conversation servers 130 may be coupled together directly, or by a local area network (LAN), or via network 120.

Conversation server(s) 130 host conversations that include contributions from one or more of participants 112. More specifically, each conversation server 130 hosts conversations on behalf of a set of users. At least some of those users are subscribers of the conversation system and thus have user communications accounts. However, as described in more detail below, some of the conversation participants need not be subscribers of the conversation system. When new content is added to a conversation by any participant, or any other changes are made to a conversation by any participant, the updates are sent to all the conversation servers 130 that host conversations for the participants in the conversation. Those host servers, in turn, send the updates to clients 110 being used by participants in the conversation. The conversation updates may be sent relatively instantaneously (e.g., within a second or two) to clients 110 of active participants in the conversation. Optionally, clients 110 of passive participants who are online and logged into the conversation system, but who are not currently viewing the conversation or are not current participating in the conversation, receive information that the conversation has been updated, without receiving the updates to the conversation. In at least some embodiments, when the participant "opens" the conversation (selects it for viewing), the updated conversation is downloaded to the participant's client 110 from conversation server 130 that hosts conversations for that participant.

Figure 2:
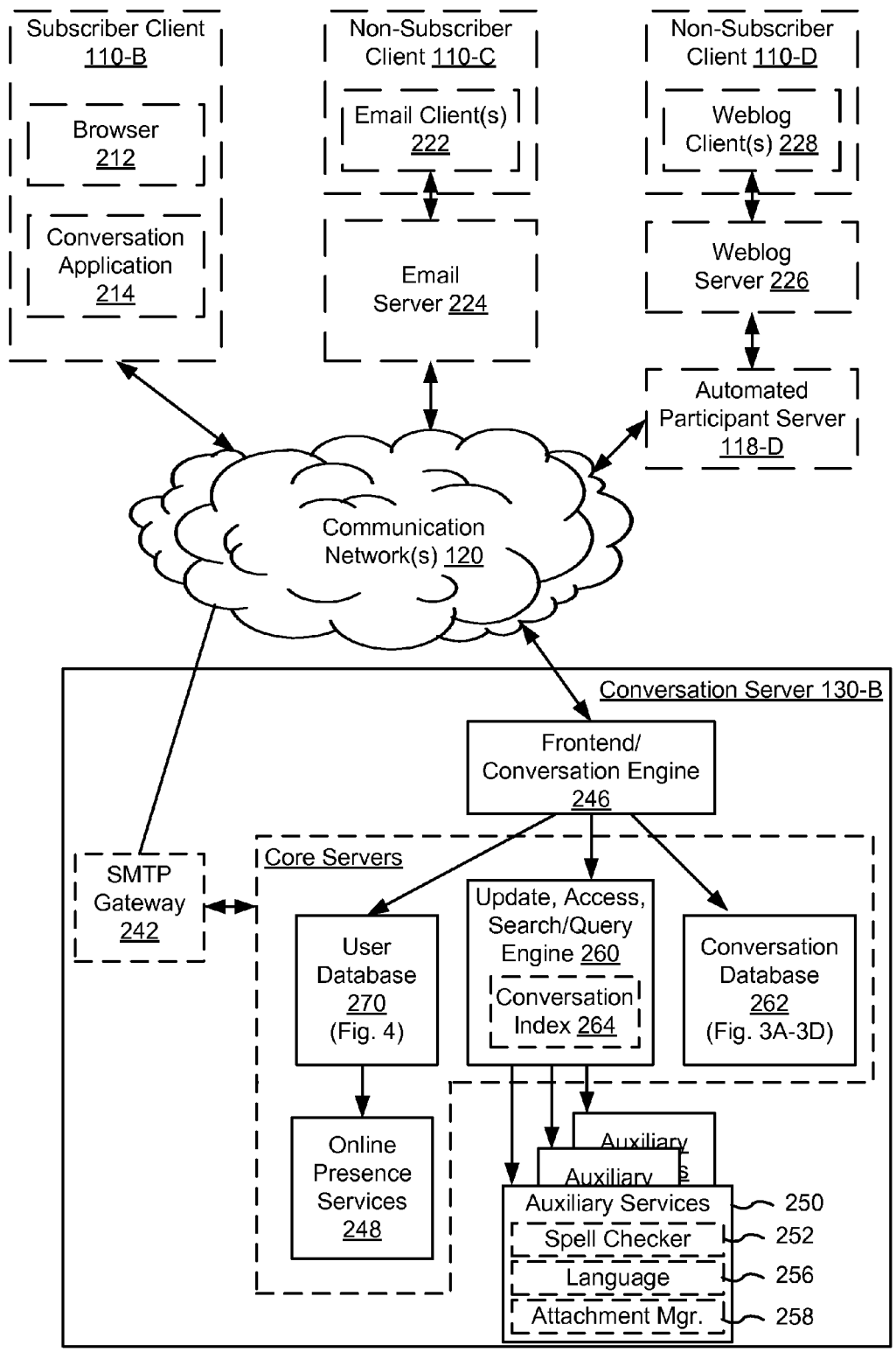
FIG. 2 is a block diagram of a distributed system including a conversation server and clients coupled by one or more communication networks, according to certain embodiments.

Attention is now directed towards FIG. 2, which illustrates an exemplary embodiment of a respective conversation server 130-B and respective clients 110-B, 110-C and 110-D. As shown in FIG. 2, respective conversation server 130-B communicates with a plurality of clients 110 through a communication network 120. FIG. 2 illustrates two primary types of clients: subscriber clients (e.g., 110-B) and non-subscriber clients (e.g., 110-C and 110-D). A subscriber client is a client that is being used by a user who has subscribed to the conversation system (e.g., has a communications account with a username/userid and password) and is a participant in one or more conversations in the conversation system. Typically, the conversation system communicates with at least one subscriber client (e.g., 110-B). In some embodiments, a subscriber client includes an executable application, such as a browser 212, to facilitate participant interaction with a respective conversation server 130. In some embodiments, browser 212 includes (or controls) a virtual machine (e.g., a Java® virtual machine) for executing software embedded in web pages and other documents rendered by browser 212. In some embodiments, browser 212 executes a conversation application 214 that is embedded, at least in part, in a web page. Typically, browser 212 is a web browser or other browser application, such as Firefox® (trademark of Mozilla Foundation), Internet Explorer® (trademark of Microsoft Corporation), Safari® (trademark of Apple Inc.), or Chrome® (trademark of Google Inc.). The web page (which may be called a "hosted conversation web page") is downloaded from a server, such as a conversation server 130-B, to client 110-B and includes executable instructions that are executed by the virtual machine of browser 212 in client 110-B. In some embodiments, browser 212 and conversation application 214 together form client application 114 of FIG. 1. Conversation application 214 facilitates participant interaction with conversation server system 130. In some other embodiments, conversation application 214 is a plug-in or extension of browser application 212.

Non-subscriber clients (e.g., 110-C and 110-D in FIG. 2) enable users who do not have communications accounts in the conversation system to participate, in at least a limited manner, in conversations hosted by conversation servers 130 in the conversation system. Participation in conversations by non-subscriber clients (e.g., 110-C and 110-D) may be limited in a number of ways. For example, the user of a non-subscriber client may be allowed to read the content of a conversation, allowed to contribute new content, but not allowed to use other features of the conversation system such as editing content already in the conversation, responding to specific portions of content previously contributed by other participants, and playing back a history of a conversation using a history log of changes to the conversation.

Non-subscriber clients (e.g., 110-C and 110-D) access conversation server 130 in a manner that is distinct from the manner used by subscriber clients (e.g., 110-B) whose users are subscribers of the conversation system (e.g., via an automated participant server 118, as illustrated in FIG. 1). In some embodiments, the functions of the automated participant server are integrated with a pre-existing component of the non-subscriber's communication system (e.g., email server 224 in FIG. 2 includes the required protocols and instructions for performing the role of an automated participant server 118). In some other embodiments, the non-subscriber's communication system sends information to a separate automated participant server, which enables the non-subscriber to participate in a conversation of the conversation system as an automated participant (e.g., weblog server 226 transmits/receives additions or changes to the conversation via a separate automated participant server 118-D which includes the required protocols and instructions for communicating with the conversation system).

An example of a non-subscriber client 110-C is an email server 224, having email clients 222. Content from host conversations can be sent to one or more email clients 222 of one or more email servers 224. In particular, when the user of an email client 222 is added as a participant to a conversation, content of the conversation (and content subsequently added to the conversation) is transmitted to email client 222 by the conversation server (e.g., 130-B in FIG. 2) that hosts the conversation via email server 224, which acts as an automated participant server. For example, a user of an email client 222 may participate in a hosted conversation by sending emails to conversation server 130-B via email server 224, and receive updates to the hosted conversation in the form of emails from conversation server 130-B. Thus, in some embodiments, the user of email client 222 is able to interact with the hosted conversation using a standard email interface.

Another example of a non-subscriber client 110-D is a weblog ("blog") server 226, having a weblog client 228. As described below, a hosted conversation can include a weblog 228 (also called a weblog client) as a participant in a hosted conversation, in which case content of the hosted conversation is published in the weblog. The published conversation is visible on weblog 228, which is hosted by weblog server 226. More specifically, when a weblog 228 is added as a participant to a conversation via an automated participant server 118-D, content of the conversation is transmitted from the conversation server 130-B that hosts the conversation to (also called "posted to") weblog 228 via automated participant server 118-D. After weblog 228 is added as a participant, new content added to the conversation is also transmitted from conversation server 130-B to weblog 228 via automated participant server 118-D. A user (e.g., a user of another client 110, FIG. 1) who views content of weblog 228 (e.g., by visiting a Uniform Resource Locator "URL" associated with weblog 228, hosted on weblog server 226) can view content of the conversation published on weblog 228.

Thus, weblog servers and email servers are examples of services which can interact with conversations as "automated participants," also sometimes called "robots," which communicate with conversation servers 130 in the conversation system via automated participant servers 118 (e.g., email servers 224 and weblog servers 226). As described above, these "automated participants" enable non-subscribing users to participate in a conversation without acquiring a user communications account for the conversation system. However, automated participants may also perform operations that are not directly tied to contributions of non-subscribing users, and interact with conversations in response to actions of other participants in the conversations and/or interact with conversations in response to external events. For example, services which interact with conversations as automated participants (e.g., via an automated participant server 118) may include: archival services, translation services, spell-check and/or grammar-check services, news or comment aggregation services, attachment modification services, that may be invoked to provide services to other participants (e.g., human participants) of a conversation.

In some implementations, automated participants (e.g., automated participants representing email clients 222 and weblog clients 228, etc.) can read but cannot provide content to a conversation, and thus are just observers. However, in some other implementations, authoring capabilities (the ability to provide content to a conversation) are provided to at least some automated participants (e.g., "email participants" that represent users of email clients and/or "weblog participants" that represent users of weblog clients, spell checking robots, etc.). In other words, in some implementations, at least a subset of the automated participants are treated by conversation servers 130 as full participants which have read/write/modify privileges that are substantially equal to the read/write/modify privileges of non-automated participants (e.g., human participants). It should be understood that the automated participants may interact with the conversation server using either: the same communication protocols as non-automated participants and operate as standard participants, or a special set of communication protocols that are provided specifically for special-purpose automated participants.

Automated participants with authoring capabilities may be used to provide structure for a conversation by generating structured content. Structured content can be broadly defined as content that is added, formatted or managed by an automated participant in accordance with a predefined set of logical instructions (e.g., a computer program stored in a computer readable storage medium). As one example of generating structured content, an automated participant may modify content (e.g., text, formatting, content contribution specific attachments etc.) added to a respective content contribution by non-automated participants. As another example of generating structured content, an automated participant may modify attachments of the conversation (e.g., converting image files attached to the conversation by a non-automated participant into a slideshow or displaying a video player application for displaying an attached video file). In yet another example of generating structured content, an automated participant determines relationships between numerical values in the conversation and generates a table, chart or graph and inserts the table, chart or graph into the conversation. Similarly, in some implementations, an automated participant adds new content contributions to a conversation that is structured (e.g., a table of contents or index for a conversation) without modifying content added to the conversation by a non-automated participant.

In some circumstances, a conversation will include both structured content (e.g., content that is automatically, without non-automated participant intervention, added, reformatted or otherwise managed by automated participants) and unstructured content (e.g., content added, reformatted or otherwise managed by non-automated participants). It should be understood that, as used herein, unstructured content refers to content that does not have structure generated by an automated participant. In other words, even when non-automated participants add content that is organized (e.g., charts, tables, outlines, etc.) this content is considered to be "unstructured content" because the structure is maintained by the non-automated participant(s) without intervention by automated participants. In some embodiments, a respective automated participant will only reformat content in certain portions of the conversation (e.g., structured content contributions/structured content units/structured blips), while other portions of the conversation (e.g., unstructured content contributions/unstructured content units/unstructured blips) are ignored by the respective automated participant and non-automated participants can add content to those portions of the conversation that will not be modified by the respective automated participant and thus will remain unstructured. It should be noted that even when one or more automated participants are ignoring one or more portions of a conversation, other automated participants may still modify the one or more ignored portions of the conversation (e.g., a spell-checker automated participant may check spelling of words in all content contributions of a conversation, even if a list-reformatting automated participant has been instructed to ignore one or more of the content contributions in the conversation).

In some implementations, a respective conversation includes both respective unstructured content added by a respective non-automated participant and respective structured content added by a respective automated participant where the respective structured content was generated by the respective automated participant based at least in part on additional unstructured content added by the respective non-automated participant. For example, a human participant has added a first content contribution describing a new product and a second content contribution including a development timeline for the new product, a product management automated participant converts the second content contribution including the development timeline by generating a "To Do" checklist based on the development timeline and replaces the development timeline with the "To Do" checklist, but leaves the first content contribution describing the new product without modifications. Thus, the exemplary conversation now includes both a modified second content contribution that includes structured content and an unmodified first content contribution that includes unstructured content. In another example, the product management automated participant generates and adds the "To Do" checklist to the conversation without replacing or otherwise modifying the development timeline in the second content contribution.

In some embodiments, a conversation server 130-B includes a front-end or conversation engine 246 for managing conversations and communications with clients 110. Conversation engine 246 manages communications between core components of the conversation server 130 and external components of the conversation system (e.g., other conversation servers 130, automated participant servers 118, application servers 119, etc.). In particular, in some embodiments, conversation engine 246 transmits requests/responses to and from update, access, search/query engine 260 and updates conversation database 262 (described in greater detail below with reference to FIGS. 3A-3C) and user database 270 (described in greater detail below with reference to FIG. 4) in accordance with requests/responses from other clients and/or conversation servers.

Front-end or conversation engine 246 utilizes (or, alternately includes) an update, access, search/query engine 260 to provide participant access to conversations, provide search functions in conversations, and provide search functions for server-specified searches (e.g., a search for conversations in a user's inbox or a search for a conversation associated with a particular webpage, as described in greater detail below with reference to method 1200). In some embodiments, one or more conversation indexes 264 are inverse indexes, mapping words, terms, tags, labels, participants to the conversations with which they are associated (e.g., the conversation that includes the respective word, term, tag, label, participant, etc.). The one or more conversation indexes 264 are used to find conversations in a conversation database 262 that match specified search queries. As content is added to conversations in conversation database 262 the one or more conversation indexes 264 are updated with that content so as to make the added content accessible by the execution of search queries. Conversation database 262 is described in more detail below with reference to FIG. 3.

Optionally, conversation server 130 includes an SMTP gateway 242 for facilitating email communication with one or more email servers 224. Conversation server 130-B also typically includes other modules such as one or more auxiliary services (modules, applications or servers) 250 for managing services related to conversations. In some embodiments, auxiliary services 250 include spell checking 252, language translation or localization 256, and/or managing attachments 258 to conversations. In some embodiments, conversation server 130-B also includes online presence services 248, enabling users to know the online status of other users (e.g., other subscribers of the conversation system), as described in greater detail below with reference to FIG. 6.

As described in more detail below with reference to FIG. 4, in some embodiments, conversation server 130 maintains a user database 270 that includes information indicating, for a respective user/subscriber, a list 414 (FIG. 4) of conversations in which the user/subscriber is a participant. Conversation server 130 updates the status (conversation state 438-1, FIG. 4) of each such conversation in the user's conversation list 414 when the state of the respective conversation changes. When (e.g., in response to a search/query from the user) conversation server 130 sends to the user a requested list of conversations (typically comprising a subset of the complete set of conversations in which the user is a participant), the list includes status information for the listed conversations. The status information in the returned list is generally a subset of the conversation state 438, as only a portion of the conversation state (e.g., whether there is any content in the conversation that has not yet been viewed by the user) is needed when displaying the list of conversations.

In the discussion below, a subscriber is a user for whom a conversation server 130 (e.g., any conversation server 130 in a set of conversation servers 130 that provide conversation services) maintains a user record or profile (see 402, FIG. 4, as described below).

Figure 3A:
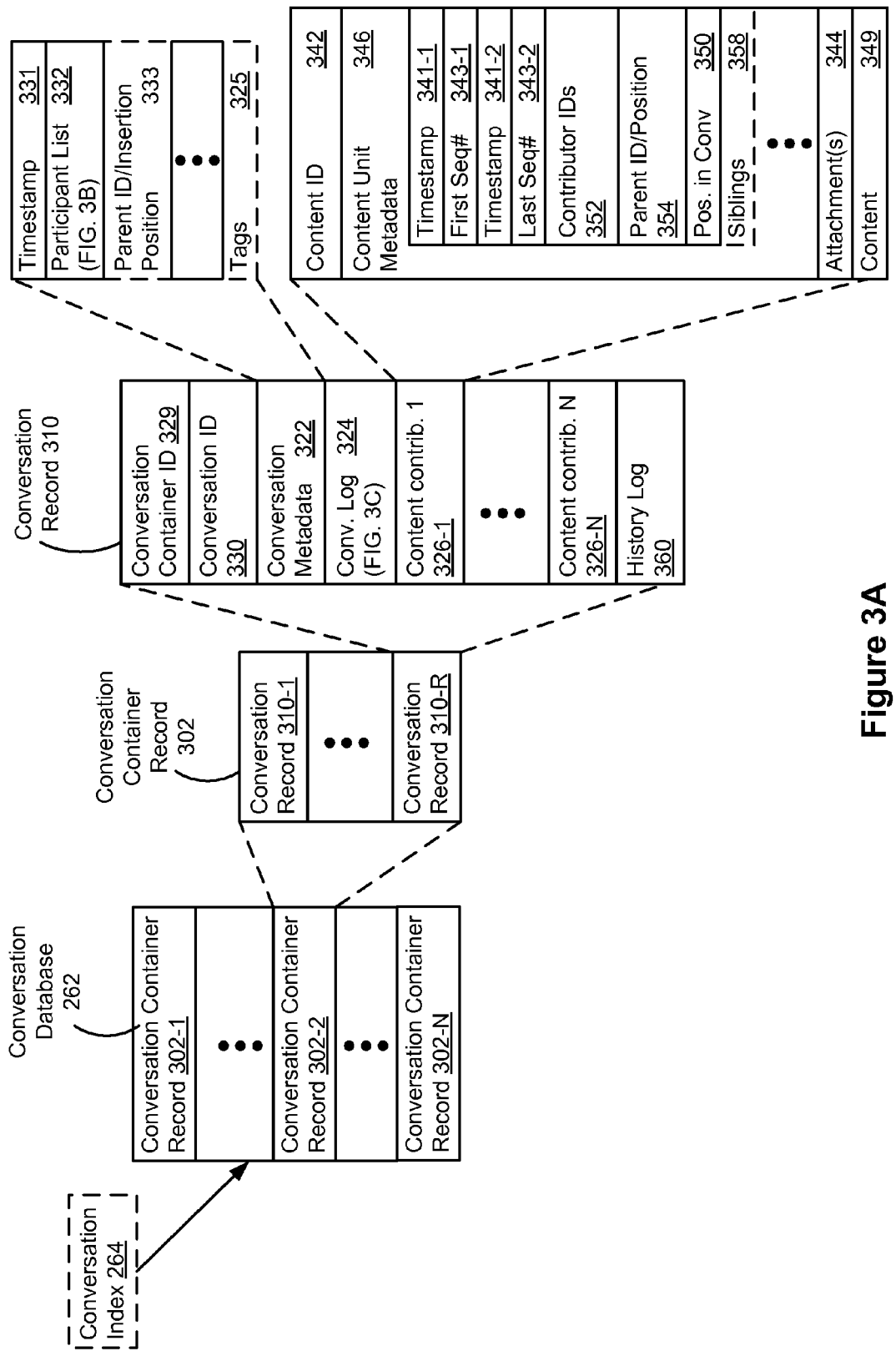
FIGS. 3A-3D are block diagrams of data structures for a conversation database, a participant list, a conversation log and identifying conversations associated with a request, according to certain embodiments.

FIG. 3A is a block diagram illustrating exemplary data structures for conversation database 262. While most conversations have a single set of participants that share all the content of the conversation, some conversations, herein called conversation containers, have a more complicated structure. In particular, a first conversation can result in any number of "side conversations" by various subsets of the participants in the first conversation, and can even include additional participants. For example, a conversation container can be used by two or more teams of participants (e.g., Team A and Team B) to negotiate an agreement, or to co-edit a document or presentation or the like. To accommodate the needs of all the participants, an initial conversation (sometimes called the primary conversation or master conversation) is started among all the participants, and then "private conversations" are spawned off of the initial conversation to enable participants in each of the teams to communicate privately with other participants of the team, while still having access to all of the content of the initial conversation. Typically, each private conversation has a set of participants that excludes at least one participant in the primary conversation. Optionally, a private conversation can include one or more additional participants (e.g., a consultant) who is not a participant in the primary conversation. Each participant only has access to the content of the conversations in which they are a participant. Typically, the participants on Team A have access to the content of both the Team A private conversation and the primary conversation, and the participants on Team B have access to the content of both the Team B private conversation and the primary conversation.

It should be understood that in the case where a conversation container includes a single conversation, all of the participants will have access to the content of the conversation. Thus, for simple conversation systems where side conversations are not necessary, conversation containers can be restricted to containing a single conversation. In other words, in some embodiments, conversation container records 302 can be combined with conversation records 310, because each conversation container record 302 includes at most a single conversation record 310.

FIG. 3A is a block diagram of exemplary data structures that support both simple conversations (i.e., single conversations with no related private conversations) as well as conversation containers that include multiple conversations (sometimes called a primary conversation and one or more sub-conversations).

Conversation database 262 includes a plurality of conversation container records 302-1 to 302-N, each containing the data for a conversation container (e.g., data associated with the conversation(s) from a conversation container). When a respective conversation container has only one conversation, the only information in the corresponding conversation container record 302 is for the single conversation, as represented by one conversation record 310. More generally, a conversation container record 302 includes one or more conversation records 310-1 to 310-R. Each conversation record 310 contains data for a respective conversation, including:
- conversation container identifier 329, which uniquely identifies the conversation container in the conversation system that corresponds to conversation container record 302 in which conversation record 310 is located;
- conversation identifier 330, which in combination with conversation container identifier 329 uniquely identifies the conversation in the conversation system that corresponds to conversation record 310 (i.e., a conversation can only be associated with a single conversation container);
- conversation metadata 322;
- conversation log 324 (sometimes called the history log), described in greater detail below with reference to FIG. 3C; and
- one or more content contributions 326-1 to 326-n; and
- a history log 360.

Conversation metadata 322 is metadata for the conversation corresponding to conversation record 310 and identified by conversation identifier 330. In some embodiments, conversation metadata 322 includes a conversation creation timestamp 331 (indicating the date and time the conversation was created), and a list of participants 332 (described in more detail below with reference to FIG. 3B) for the conversation. Metadata 322 optionally includes other metadata, such as parent ID/Insertion Position data 333 and metadata identifying tags 325 (e.g., system and/or user assigned labels that are "public," and thus available to all participants in the conversation) associated with the conversation, and other characteristics of the respective conversation associated with conversation record 310.

When a conversation container contains more than one conversation, the participant list 332 for the primary conversation of the conversation container will typically include all the participants in all the conversations in the conversation container. However, in some embodiments, private conversations (i.e., conversations other than the primary conversation) in the conversation container can have additional participants that are not participants of the primary conversation. Thus, each of the private conversations in a conversation container will typically have a participant list 332 that includes at least one of the participants in the primary conversation of the same conversation container, and optionally includes one or more participants who are not participants in the primary conversation of the same conversation container.

In addition, when a conversation container contains more than one conversation, a parent ID/insertion position 333 is provided for each of the private conversations, but not for the primary conversation. Parent ID/insertion position 333 identifies the parent of the private conversation, as well as the position in the identified parent conversation at which content of the private conversation should be inserted when viewed by participants of the private conversation. Typically the parent of a private conversation is the primary conversation of the conversation container, but in some instances the parent of a private conversation can be another parent conversation that is higher up in the hierarchy (or graph) of conversations in the conversation container. When a participant of a private conversation views the conversation container that includes the private conversation, the content of both the parent conversation and the private conversation will be seen (assuming the participant is also a participant of the parent conversation). In the less common situation, in which a user is a participant of a private conversation, but is not a participant in the parent conversation, the user will see only the content of the conversation (or conversations) in the conversation container for which they are a participant.

In some embodiments, conversation log 324 records all changes to the conversation, including changes to the content of the conversation as well as to the set of participants and other characteristics of the conversation. Conversation log 324 is accessed when participants ask to see the state of the conversation, or a content unit of the conversation, at one or more points in time. For example, conversation log 324 can be used to reconstruct or review the sequence of edits made to a content unit of the conversation. This is sometimes called "playing back" or "playback" of the conversation. Playback of a conversation can be performed in a variety of ways, including time forward or time backward, and showing updates to just a portion of the conversation or to the entire conversation.

A respective content contribution 326 (also called a content unit, or "blip") in a conversation can be a message, much like an email message or instant message. Other content contributions 326 in a conversation can be documents (e.g., a report, meeting agenda, etc.), pictures, presentations, audio files, video files, or virtually any other type of electronic document or content. In some embodiments, there are few if any distinctions between email messages and other types of content contributions to a conversation. In some embodiments, the data in a conversation record 310 for each content contribution 326 includes:

- a content identifier 342 (e.g., a value uniquely identifying the content contribution, either globally within the conversation system, or locally within a particular conversation);
- content unit metadata 346, identifying characteristics of content contribution 326;
- optionally, one or more attachments 344 (e.g., pictures, videos, documents, files, archives, audio, animations, links, etc.); and
- content 349 (e.g., text, images, document content, etc.) of content contribution 326.

In some embodiments, content unit metadata 346 for a content unit 326 includes:

- a first timestamp 341-1 denoting the date and time the content unit was first created (added to the conversation), and a corresponding sequence number 343-1 corresponding to the state of the conversation when the content unit was first created;
- a last timestamp 341-2 denoting the last date and time that the content unit was edited, and a corresponding sequence number 343-2 corresponding to the state of the conversation when the last edit to the content unit was made; having both the first and last timestamps and sequence numbers is useful (for example) when playing back changes to the content unit, or when playing back changes to a portion of the conversation that includes the content unit or displaying a participant specific markup that indicates the changes to a conversation since the last time that a participant viewed the conversation; and
- contributor identifiers 352 (e.g., participant addresses) of the content unit's contributors or author(s), optionally ordered by the order of first contributions of each author to the content unit; it should be understood that while most content units have a single author, content units can be written collaboratively, in which case they have multiple authors.

In some embodiments, metadata 346 for a content unit 326 also includes one or more of the following:

- parent identifier 354 provides an identifier of or pointer to the parent content unit to which this content contribution is a response or reply;
- position 350 provides an indicator of the position of this content unit in a conversation); position 350 may be used to govern how the content unit is displayed when displaying two or more content units of the conversation; and
- optionally, siblings 358 of this content contribution (i.e., identifiers or pointers to sibling content units, which are other responses or replies to the parent of this content unit).

Typically, metadata 346 for a content unit 326 includes at least one value (e.g., position 350 or parent identifier 354) that identifies or represents the position of the content unit 326 in the conversation.

A conversation index 264 enables fast access to conversations in the conversation database 262 through searches of the index by update, access, search/query engine 260 (FIG. 2).

Figure 3B:
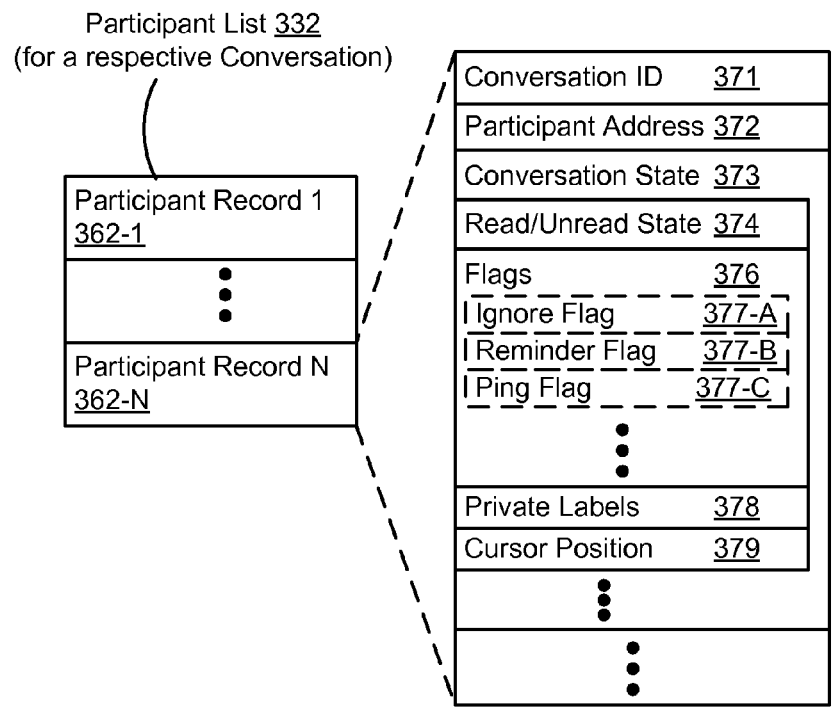

FIG. 3B is a block diagram illustrating data structures for participant list 332 in conversation metadata 322 (FIG. 3A) of a conversation record 310. A participant list 332 includes a plurality of participant records 362, one for each participant in a respective conversation. In some embodiments, each participant record 362 includes the following information, or a subset of the following information:

- a conversation identifier 371;
- a participant address 372, which may also be called a participant identifier; the participant address uniquely identifies the participant among all the participants in conversations in the conversation system;
- a per-user conversation state 373; for example, conversation state 373 may indicate read/unread state 374 of this conversation with regard to the respective participant corresponding to participant record 362; conversation state 372 optionally includes information about which content contributions in the conversation have been viewed by the participant, and which have not yet been viewed;
- conversation state 373 for a conversation participant may include flags 376; optionally, flags 376 may include an ignore flag 377-A (also sometimes called the mute flag), which if present, indicates that the participant has instructed the conversation system not to notify the participant of updates to the conversation, a reminder flag 377-B and a ping flag 377-C;
- conversation state 373 for a conversation participant may also include private labels (sometimes called "folders" or "folder designations") 378 assigned by this participant to this conversation, which are for use only by this participant (e.g., when searching for conversations, the participant can include a private label as one of the query terms); private labels can be applied by participants to help organize their conversations and to make it easy to locate conversations based, in part, on what labels have been applied to them; it is noted that tags 325 are public information, available to all participants in a conversation, while the private labels of each participant are private to that participant; conversation state 373 for a conversation participant may also include a cursor position 379, which indicates either the portion of the conversation currently being viewed by the participant (and the position of the user's cursor within a respective content unit if the user is entering or editing a content unit), or the portion of the conversation last viewed by the participant if the participant is not currently displaying or viewing the conversation;
- optionally, other metadata related to this respective participant with respect to this particular conversation.

Another optional flag in per-user conversation state 373 for a respective participant is a reminder flag 377-B. Per-user conversation state 373 also includes a corresponding timestamp indicating the date and time (or pair of timestamps to indicate a range of dates/times) at which to reminder the participant to pay attention to the conversation or a portion thereof, optionally a user ID identifying the user who initiated the reminder (in some embodiments, reminders can be sent by a user not only to themselves, but to other participant(s) in the conversation), and optionally a content range indicator for specifying a portion of the conversation that is the subject of the reminder.

Another optional flag in per-user conversation state 373 for a respective participant is a ping flag 377-C. A ping flag is included in per-user conversation state 373 when another participant has sent a ping (which is a form of notification, or instant message) to the participant (typically an online participant), or when the participant has sent a ping to another participant. The ping flag, when present, indicates to the client application that a ping notification (e.g., a pop-up box) is to be displayed.

Much of the information (e.g., conversation state 373) in each participant record 362 is private to that participant and is not shared with other participants of the conversation or other users in the conversation system. In some embodiments, the cursor position 379 of each participant who is actively editing a content unit or entering new text in a conversation is published to and visible to other participants of the conversation, unless a respective participant has elected to suppress publication of their cursor position, in which case that aspect of the participant's conversation state 373 is not considered to be private to the participant. When there are a plurality of active participants who are editing the same conversation, cursor position information for each of the active participants is transmitted to the clients of the active participants (via their hosting conversation servers). At the client of a respective participant, a plurality of cursor positions (corresponding to a plurality of different participants) are concurrently displayed when the cursor positions are sufficiently close to each other to enable concurrent display.

As described above, in some embodiments, for each respective conversation record 310, conversation server 130 maintains for each respective participant 362 a conversation state 373 of the respective conversation in regard to the respective participant. Conversation server 130 provides to the respective participant (e.g., to a client that is displaying the conversation to the participant) the state of the respective conversation in regard to the respective participant. In some embodiments, this includes providing to the participant (e.g., to the client being used by the participant) the read status of the content units of the respective conversation in regard to the participant (i.e., indicating which content units have already been read or viewed (in their current state) by the participant, and which have not). In some embodiments, providing conversation state 373 of the respective conversation in regard to the respective participant includes private labels 378, specified by the respective participant for the respective conversation.

In some embodiments, providing state 373 of the respective conversation in regard to the respective participant includes providing, in accordance with instructions from the participant, metadata (e.g., ignore flag 377-A) to ignore the respective conversation. This provides a participant with an option to manage conversations in accordance with a rule, in effect to archive conversations, and to reduce congestion in a conversation viewer. For example, when a participant marks a conversation with a system defined label of "ignore" or "mute," ignore status flag 377-A for the participant (for the marked conversation) is set, and the conversation is thereafter treated (on behalf of this particular participant) much like an archived message or conversation. Other participants of the conversation may continue to see the conversation in their list of active conversations if they have not marked the conversation with the "ignore" label.

In some embodiments, the per-user conversation state 373 for each participant of each conversation is stored in conversation database 262, as shown in FIGS. 3A-3B. In other embodiments, the per-user conversation state 373 for each participant of each conversation is stored in user database 270, discussed in greater detail below with reference to FIG. 4. In yet other embodiments, per-user conversation state 373 information (for each participant of each conversation) is stored in a separate database or server (sometimes called the "user supplement" database or server) that is separate from conversation database 262 and user database 270. Optionally, pointers to per-user conversation state 373 information (e.g., record) in the user supplement database may be stored in both user database 270 and conversation database 262. Alternately, such pointers are not stored, and the per-user conversation state 373 for a particular user of a respective conversation is retrieved, typically for transmission to a client participating in the conversation, from the user supplement database on an as-needed basis and is updated in accordance with operations (e.g., reading content, entering end content, editing content, etc.) performed by the participant.

As described in more detail below, in some embodiments, conversation server 130 stores, for each respective subscriber, a contact list (416, described in FIG. 4) associated with the respective subscriber. In some embodiments, the contact list is stored in a user database 270 (in FIGS. 2 and 4).

When a conversation is sent to a client (e.g., 110-B in FIG. 2) for display to a user, the client receives only a portion of the conversation record 310 (FIG. 3A) for the conversation. For example, in some embodiments, the portion of conversation record 310 sent to and stored at the client excludes conversation log 324, and conversation state 373 of other participants (except, the cursor position of other currently active participants in the conversation who have not blocked the transmission of their cursor position). In some embodiments, conversation log 324 is sent to a client only when the participant at that client has requested playback of the conversation, or a user-specified portion of the conversation, or has requested to view the state of the conversation at a particular time or point in the past. It should be understood that sending only the portion of conversation record 310 that is relevant to the user to the client associated with the user is advantageous in some embodiments, because it reduces network bandwidth usage and the storage space required at the client.

Figure 3C:
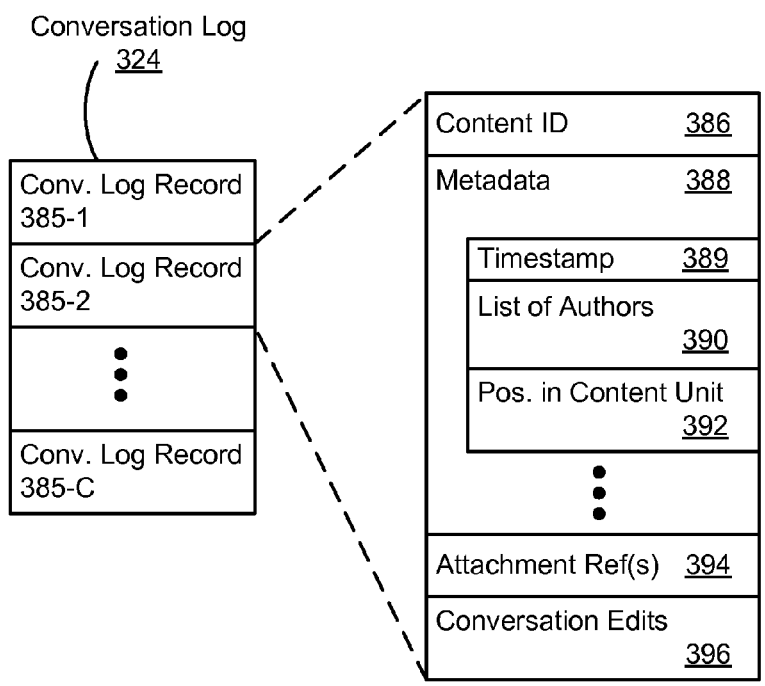

FIG. 3C is a block diagram illustrating data structures for conversation log 324, according to some embodiments. As shown in FIG. 3C, conversation log 324 includes a time ordered sequence of log records 385-1 to 385-C (sometimes called log entries). A respective log record 385 includes a content ID 386, identifying the content unit (if any) updated by the conversation edits recorded in log record 385, metadata 388 relevant to the conversation edits recorded in log record 385, references 394 (e.g., one or more pointers or file names) to any attachments added to the conversation by the conversation edits recorded in the log record, and a list of the conversation edits or changes 396 recorded in log record 385. Metadata 388 includes a timestamp 389 and/or sequence number that uniquely identifies the order of the conversation edits in log record 385, relative to the conversation edits in other log records for the same conversation. Metadata 388 also identifies a list of authors (also called contributors) 390 of the conversation edits in log record 385, and the starting position 392 of the conversation edits recorded in log record 385. While the authors list 390 will contain only one author for most log records 385, when multiple authors make edits or contribute content to a content unit during a short period of time, or during overlapping time periods, a single corresponding log record 385 includes a list 390 of all of the authors who contributed to the change in the content unit recorded by that log record 385. In some embodiments, starting position 392 is incorporated into conversation edits 396, as an offset or position setting for the first edit or update operation of conversation edits 396, and in those embodiments the log records do not have a separate starting position 392 field.

Figure 3D:
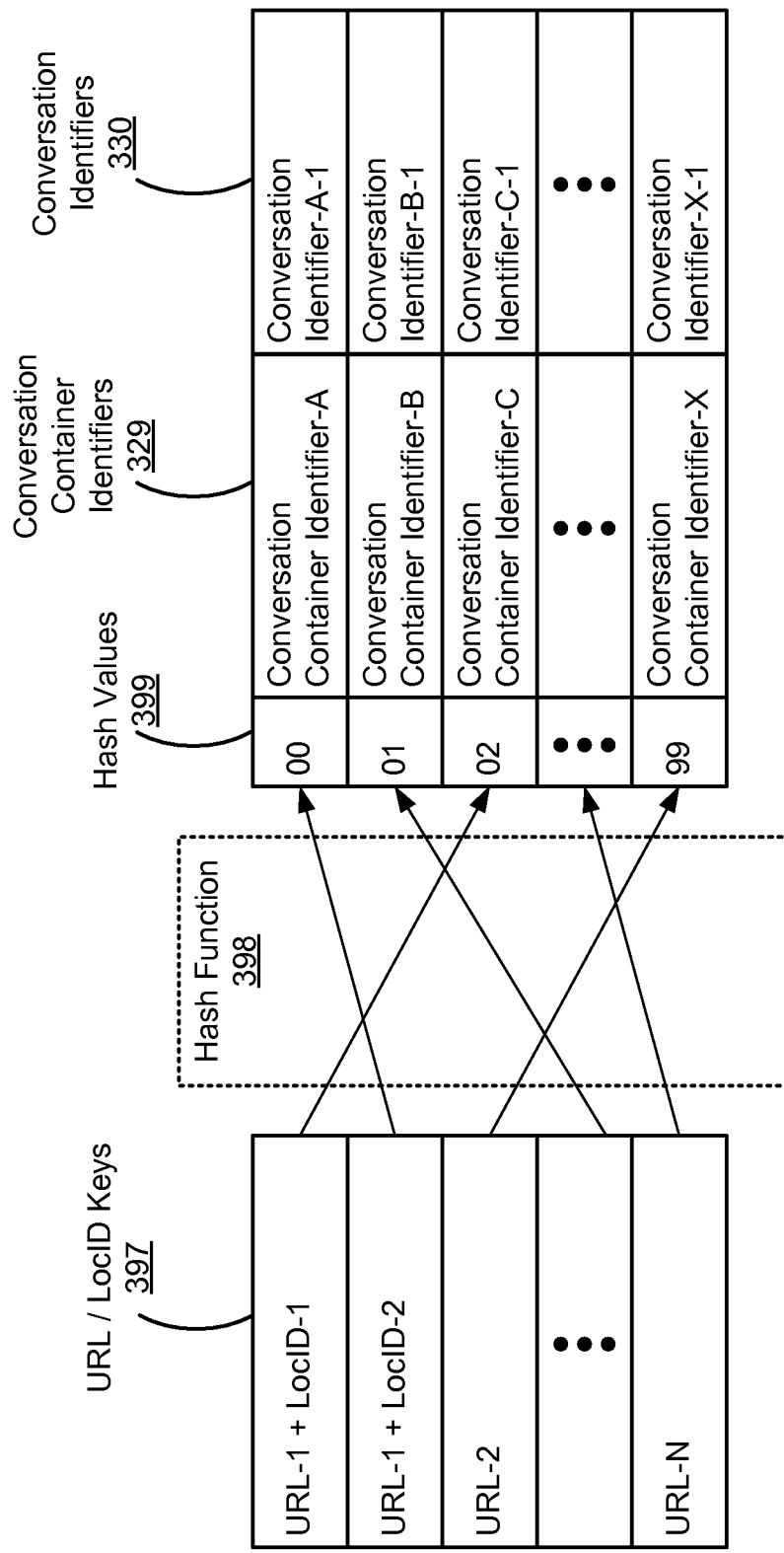

FIG. 3D is a block diagram illustrating data structures for identifying a conversation associated with a request, according to some embodiments. As described in greater detail below, in some embodiments, a newly initialized conversation is generated in response to a first request for a conversation associated with a particular webpage (e.g., a request automatically generated when the particular webpage is rendered). In some embodiments, the newly created conversation is associated with a URL of the particular webpage and optionally a location identifier (e.g., LocID) of a location within the particular webpage at which the conversation is to be rendered. After the conversation is created it is given an internal identifier (e.g., a conversation container identifier and/or a conversation identifier). When the conversation is requested by a conversation client, the conversation client will typically use the internal identifier (e.g., a conversation container identifier and/or a conversation identifier) to access the conversation associated with the webpage. In contrast, in most circumstances, when the conversation is requested by a client rendering the particular webpage, the request for the conversation associated with the particular webpage will include only the URL of the particular webpage and, optionally the LocID for the conversation in the particular webpage. In these embodiments, conversation database 262 includes a set of data structures for using the URL (and optionally LocID) from the request to identify the conversation associated with the particular webpage. In the particular embodiment illustrated in FIG. 3D, when the request including a URL (and optionally LocID) is received the URL (and optionally LocID) is used as a key 397 in a hash function 398. The hash function 398 computes a corresponding hash value 399 from the respective URL (or combined URL and LocID) key 397 that identifies the respective internal identifier (e.g., a respective conversation container identifier 329 and/or a conversation identifier 330) for the conversation associated with the particular webpage. The internal identifier can then be used to retrieve the conversation.

Figure 4:
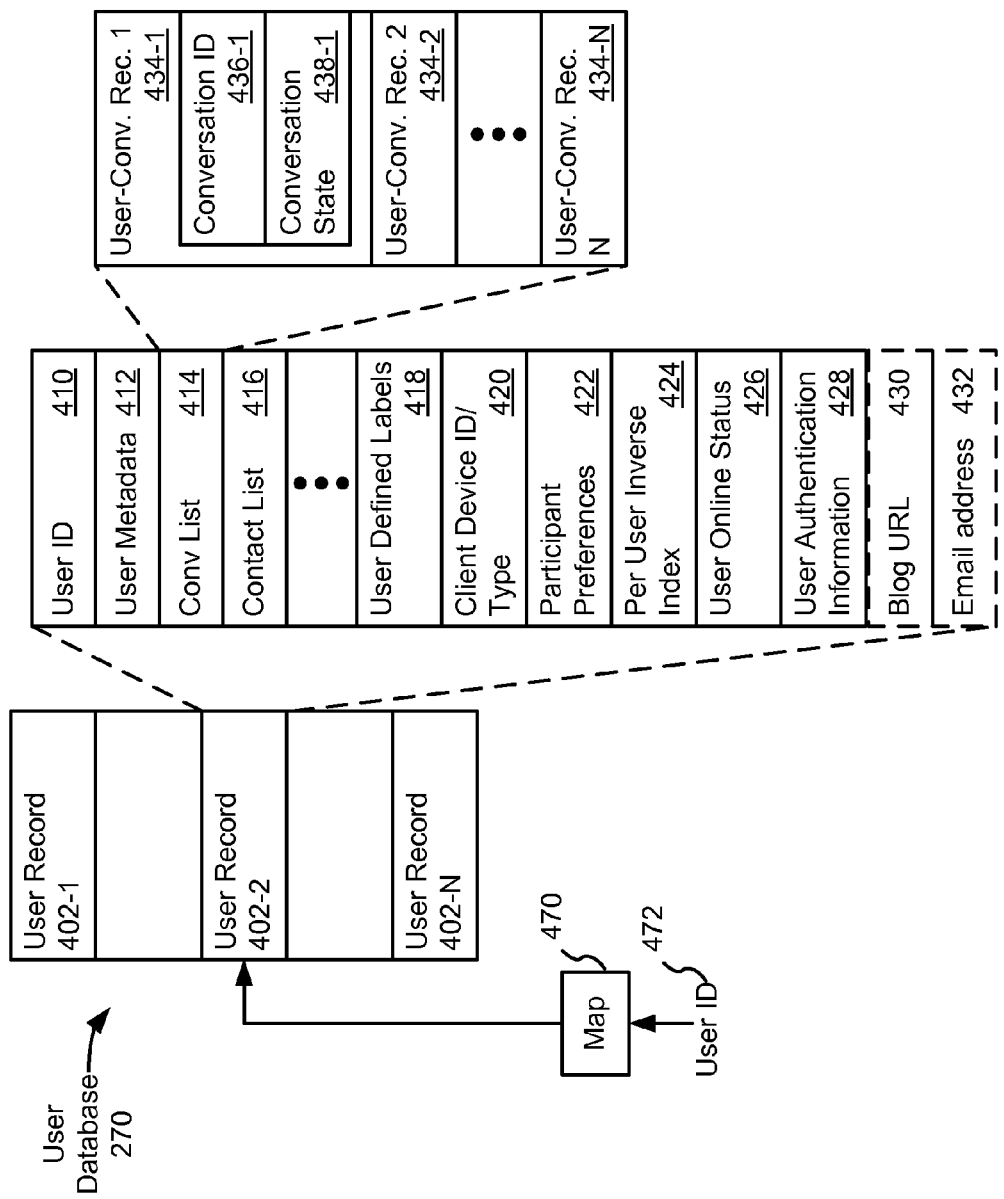
FIG. 4 is a block diagram illustrating a data structure for a user database, according to certain embodiments.

FIG. 4 is a block diagram illustrating a data structure for a user database 270, according to certain embodiments. Database 270 includes a plurality of user records 402. In some embodiments, each user record 402 includes:

- a user identifier 410 for a subscriber of the conversation system;
- user metadata 412, containing information about or for the user;
- a list of conversations 414 in which the user is a participant;
- the user's contact list 416 (typically a list of contacts 416 that corresponds to and is personal to user);
- optionally, labels 418 defined by the user for labeling or classifying conversations;
- optionally, a client device identifier and/or type 420 of a client device being used by the user to communicate with conversation server 130, or alternately, the identifier and type of client devices that the user has used in conjunction with the conversation server in the past; in some embodiments, the type of the client (e.g., desktop, cell phone, etc.) may be used to determine what content from conversations is sent to the user;
- optionally, preferences 422 of the user when participating in a conversation;
- optionally, an inverse index 424 associated with the user;
- a current online status 426 of the user (e.g., offline, online, busy, away, etc.);
- authentication information 428 for the user (e.g., username, password, and optionally other values for authentication of the user);
- optionally, other data relating to the user, such as one or more blog URLs 430, email addresses 432, etc.

Conversation list 414 associated with a user includes a plurality of user-conversation records 434, each record relating to a conversation in which the user is a participant. Each user-conversation record 434 includes:

- a conversation identifier 436 that identifies the respective conversation, and
- per-user conversation state information 438, which may be the same as (or a pointer to) conversation state 373 in participant record 362 of a conversation record 310 in conversation database 262 (FIGS. 3A-3B). As discussed above, in some embodiments, per-user conversation state information is stored in a separate database or server (sometimes called the user supplement database or server), in which case user-conversation record 434 includes a conversation identifier 436, but not the per-user conversation state information 438.

As noted above, in some embodiments the conversation system includes a separate per-user inverse index 424 for each user of the conversation system; each such index 424 is an index that maps the terms, labels, tags, etc. of the conversations in which a user is participant to the conversations (and optionally, to the content units with the conversations, or locations within the conversations) containing those terms, labels, tags, etc. These per-user indices enable fast indexing and fast searching of the conversations in which a user is a participant. In some embodiments, additional indices (sometimes called "big wave" indices) are used to provide fast indexing and access to "big wave" conversations having large numbers (e.g., more than a threshold number, such as 500 or 100) of participants. In these embodiments, the content of "big wave" conversations is not indexed in the per-user inverse indices 424, and is instead indexed in one or more "big wave" indices. Similarly, in some embodiments in which groups of users participate in conversations as groups, additional per-group indices are used to index those conversations and to provide fast searching of those conversations; and the conversations (if any) in which a respective user participates only as a group member are not included in the user's per-user inverse index 424. Thus, when a user performs a search for conversations satisfying a user-specified query, multiple indices may be searched, in which case the search results from the multiple indices are merged (and optionally sorted and/or reduced) prior to returning the search results to the requesting user.

In some embodiments, conversation server 130 provides the same content of a conversation to all participants of the conversation, and provides each online participant with online presence information for the other participants in the same conversation. In some embodiments, the server allows a participant of a conversation to disable publication of their online presence information to other participants in the conversation. In some embodiments, the server allows a participant of a conversation to selectively enable publication of their online presence information to other participants in the conversation (e.g., allowing publication of the participant's online presence only to users designated by the participant; or alternately, disabling publication of the participant's online presence to users specifically designated by the participant).

In some embodiments, conversation server 130 provides the same content to each participant, formats content of the conversation to be compatible with one or more content types that a client 110 associated with a respective participant has been configured to receive, and transmits the formatted content to the client.

In some embodiments, when delivering the content of a conversation to certain clients (e.g., a cell phone or PDA), conversation server 130 formats the content by compressing multimedia data associated with the content (e.g., to reduce bandwidth requirements). In some embodiments, the server provides a subset of multimedia data associated with the content (e.g., a thumbnail image, or short audio/video clip) to the client. In some embodiments, the conversation server removes multimedia data associated with the content (e.g., strips out multimedia and just provides text) that is delivered to the client.

In some embodiments, conversation server 130 authenticates a user using authentication information 428 prior to providing content from conversations to the user.

In some embodiments, conversation server 130 sends content from conversations in which a respective user is a participant to a weblog (e.g., weblog server 226 or weblog client 228), specified (e.g., by Blog URL 430) in user record 402 for that user. When a respective participant in a conversation is an automated participant, content of the conversation is sent to the automated participant. The automated participant may represent a weblog, an email server or account, or a service provider such as a translation service, spelling checking service, or the like in the conversation.

FIGS. 5A-5E are flowcharts representing methods for hosting conversations at a server, according to certain embodiments. These methods are governed by instructions that are stored in a computer readable storage medium and that are executed by one or more processors of one or more servers. Each of the operations shown in FIGS. 5A-5E may correspond to instructions stored in a non-transitory computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is executed or interpreted by one or more processors.

Figure 5A:
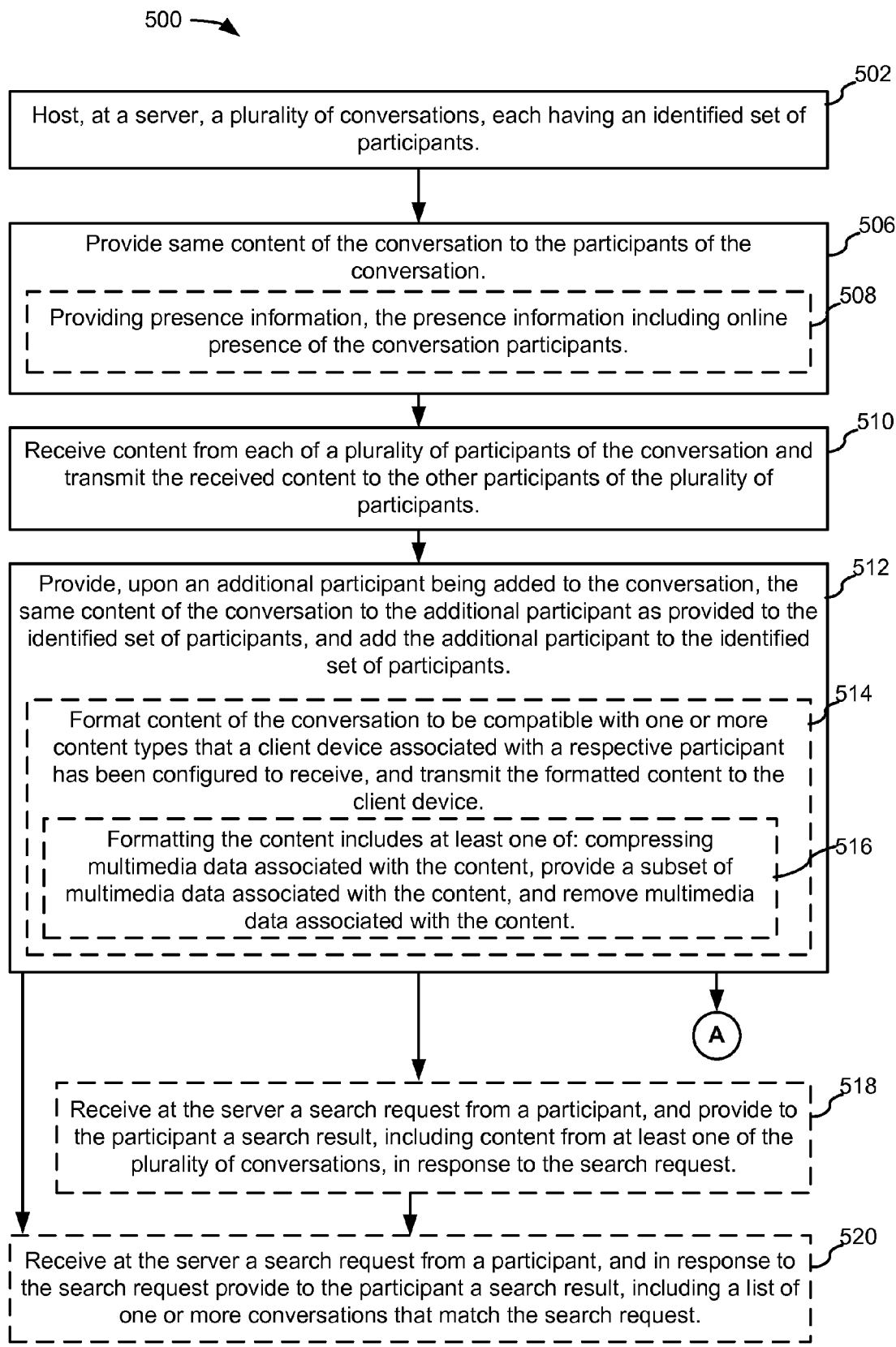
FIGS. 5A-5E are flowcharts representing a method for hosting conversations at a conversation server, according to certain embodiments.

FIG. 5A shows a method 500 for hosting conversations at a server (e.g., a conversation server 130). A server hosts (502) a plurality of conversations, each having an identified set of participants. The server is typically one of a plurality of conversation servers 130 that hosts conversations in a conversation system.

Conversation server 130 provides (506) the same content from a conversation to all the participants of the conversation. In some embodiments, the server also provides (508) online presence information of each of the plurality of participants in the conversation to other participants in the conversation. The server receives (510) content from each of a plurality of participants of the conversation and transmits the received content to the other participants of the plurality of participants.

Conversation server 130 provides (512), upon an additional participant being added to the conversation, the same content of the conversation to the additional participant as provided to the identified set of participants, and adds the additional participant to the identified set of participants. As noted above, when the additional participant is using a client (e.g., 110 in FIG. 1) capable of receiving the entire content of the conversation, the entire content of the conversation is sent to the client currently being used by the additional participant. In some embodiments, the "entire content of the conversation" includes all of the content that was added by previous participants in the conversation before the additional participant was added to the conversation as well as any automatically generated content (e.g., content generated by the server system) that was included in the conversation at the time the additional participant was added. As a result, a participant added to a conversation, even long after the conversation has begun, receives content contributed to the conversation before the participant was added to the conversation.

In some examples, participants can participate in "private conversations" (as described in greater detail above with reference to FIG. 3A); edit a draft message in "team draft mode"; opt out of automatically sharing their content (e.g., by restricting access to content added by a respective participant so that it can only be accessed by other participants that have been specifically approved by the respective participant). In some examples, participants may be restricted from the ability to add additional participants to a respective conversation without the approval of one or more other participants on the respective conversation (e.g., requiring approval of half of the other participants or all of the other participants before adding a new participant to the respective conversation).

In some embodiments, conversation server 130 formats (514) content of the conversation to be compatible with one or more content types that a client associated with a respective participant has been configured to receive, and transmits the formatted content to the client (e.g., 110 in FIG. 1). In some embodiments, conversation server 130 formats content from a conversation by performing (516) at least one of: compressing multimedia data associated with the content, providing a subset of multimedia data associated with the content, and removing multimedia data associated with the content (e.g., removing video and audio data but leaving text content).

In some embodiments, conversation server 130 receives (518) a search request (often called a query or search query) from a participant, and provides to the participant a search result, including content from at least one of the plurality of conversations, in response to the search request. Alternately, or in addition, in response to the received search request the server provides (520) to the participant a search result that includes a list of one or more conversations that match the search request. In some embodiments, the search request is processed by search/query engine 260 (FIG. 2), using an inverse index 264 of conversation content to identify conversations, or content within one or more conversations, that match the search request.

Figure 5B:
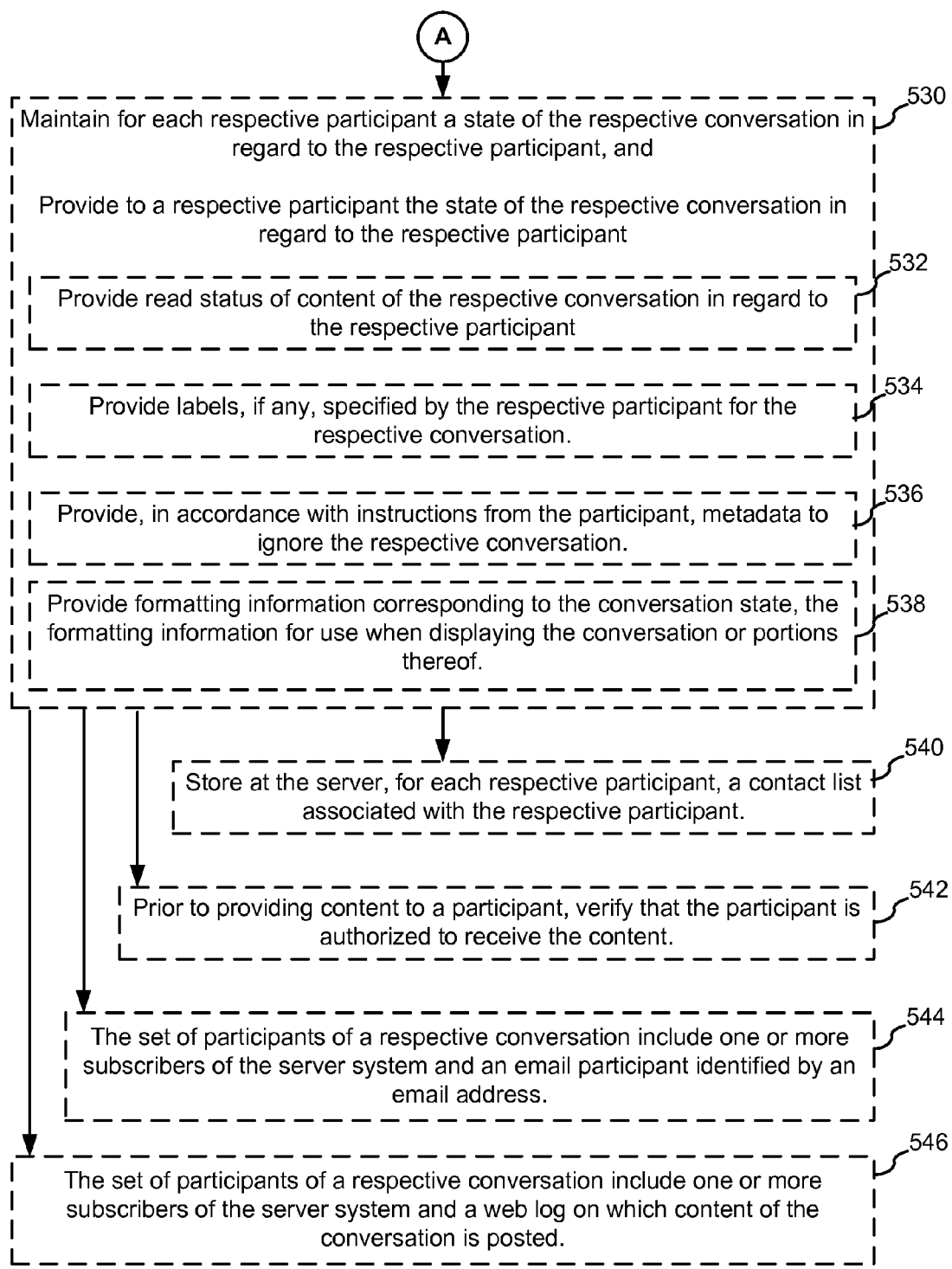

FIG. 5B shows a continuation of method 500 of FIG. 5A. A server maintains (530) for each respective participant a state of the respective conversation in regard to the respective participant, and provides to the respective participant (e.g., to the client currently being used by the participant to view the conversation) the state of the respective conversation in regard to the respective participant. In some embodiments, this includes providing (532) to the participant (e.g., to the client being used by the participant) the read status of the content units of the respective conversation in regard to the participant (i.e., indicating which content units have already been read or viewed by the participant, and which have not). In some embodiments, providing the state of the respective conversation in regard to the respective participant includes providing (534) labels, if any, specified by the respective participant for the respective conversation.

In some embodiments, the metadata maintained for a conversation with respect to a particular participant includes (536) metadata (e.g., ignore flag 377-A in FIG. 3B) to ignore the respective conversation, in accordance with instructions from the participant. For example, the ignore metadata may be provided to search engine 260 (FIG. 2) of conversation server 130. In some embodiments, conversation server 130 provides (538) formatting information corresponding to the conversation state, the formatting information for use when displaying the conversation or portions thereof. In some embodiments, the formatting information includes one or more of: color (e.g., of text, background, borders), font, indenting, position (e.g., superscript or subscript), etc.

In some embodiments, conversation server 130 stores (540), for each respective participant, a contact list associated with the respective participant. In some embodiments, the server verifies (542) (using authentication information 428)

that the participant is authorized to receive the content of a conversation, prior to providing content to a participant.

In some embodiments, conversation server 130 maintains (544) a set of participants of a respective conversation, including one or more subscribers of the conversation system and an email participant identified by an email address. In some embodiments, conversation server 130 maintains (546) a set of participants of a respective conversation, including one or more subscribers of the conversation system and a weblog on which content of the conversation is posted.

Figure 5C:
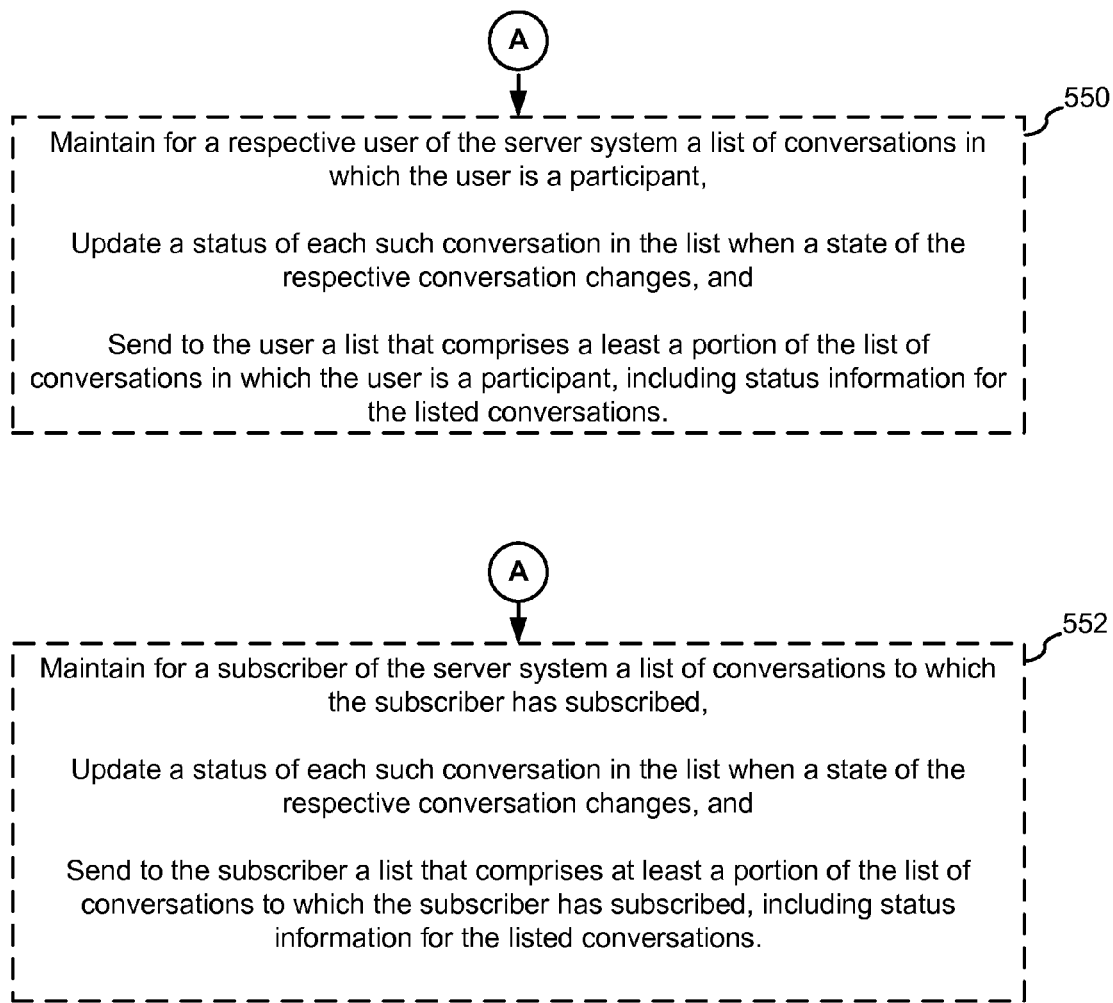

FIG. 5C shows a continuation of method 500 of FIG. 5A. In some embodiments, conversation server 130 maintains (550) for a respective user (of the conversation system hosted by a set of servers that includes conversation server 130) a list of conversations in which the user is a participant. Conversation server 130 updates a status of each such conversation in the list when a state of the respective conversation changes. Upon request from the user (e.g., from a client being used by the user) the server sends to the user a list comprising at least a portion of the list of conversations in which the user is a participant, the list including status information for the listed conversations. In some embodiments, each respective user for which conversation server 130 maintains (552) a list of conversations is a subscriber of the conversation system. Conversation server 130 updates a status of each such conversation in the list when a state of the respective conversation changes. Upon request from the user (e.g., from a client being used by the user) conversation server 130 sends, to the subscriber a list that comprises at least a portion of the list of conversations to which the subscriber has subscribed, including status information for the listed conversations.

Figure 5D:
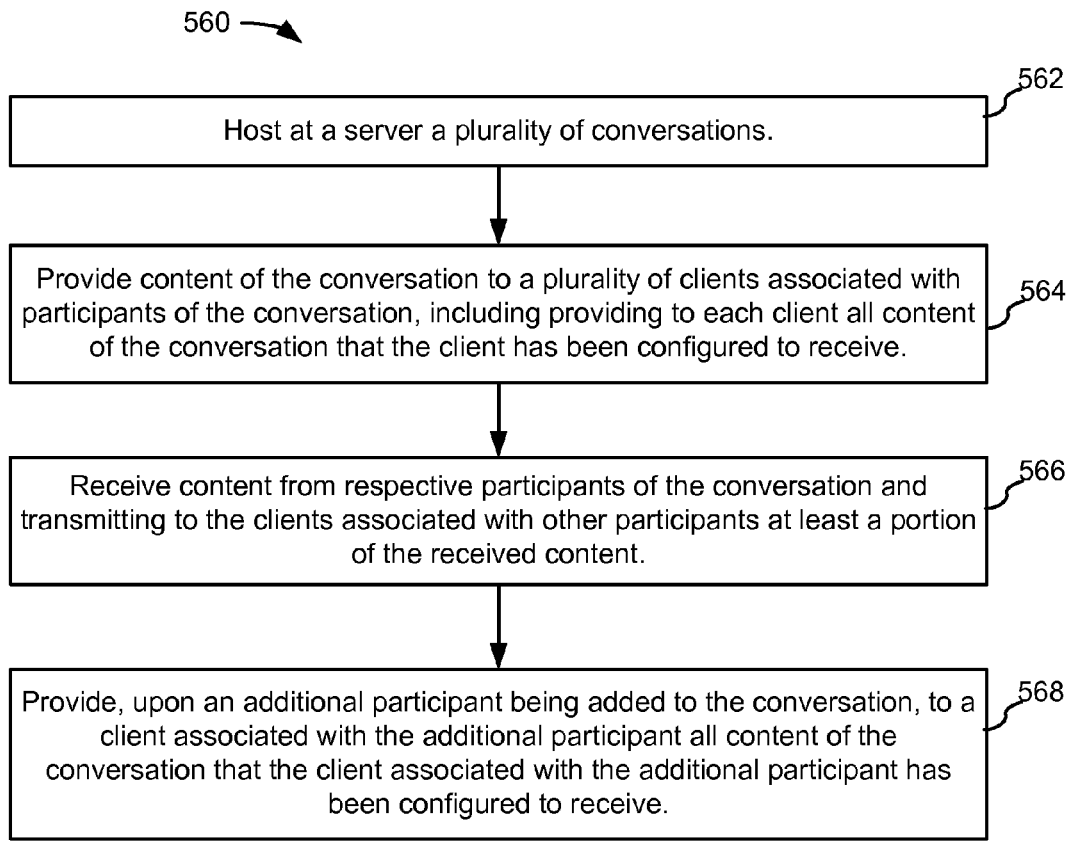

FIG. 5D shows a method 560 of hosting electronic messages. A server hosts (562) a plurality of conversations. Conversation server 130 provides (564) content of the conversation to a plurality of clients (e.g., 110 in FIG. 1) associated with participants of the conversation, including providing to each client all content of the conversation that the client has been configured to receive.

Conversation server 130 receives (566) content from respective participants of the conversation and transmits to the clients associated with other participants of the conversation at least a portion of the received content. Conversation server 130 also provides (568), upon an additional participant being added to the conversation, to a client associated with the additional participant all content of the conversation that the client associated with the additional participant has been configured to receive.

Figure 5E:
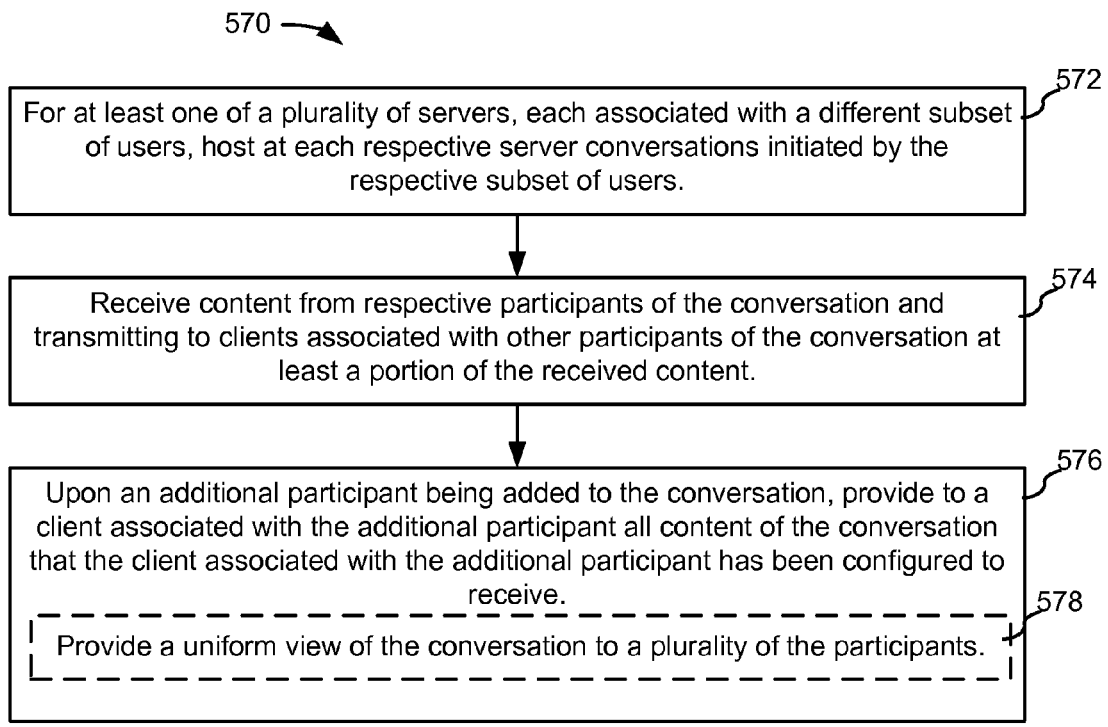

FIG. 5E shows a method 570 of hosting electronic messages. For at least one of a plurality of servers, each associated with a different subset of users, a server hosts (572) conversations initiated by the respective subset of users. Conversation server 130 receives (574) content from respective participants of the conversation and makes the content available to other participants of the conversation. For participants associated with other conversation servers, the content is transmitted to those other conversation servers. The content is transmitted to the participants when they log in and request the content of the conversation.

Conversation server 130 also provides (576), upon an additional participant being added to the conversation, all the content of the conversation to a client associated with the additional participant, or alternately, all content of the conversation that the client associated with the additional participant has been configured to receive. In some embodiments, conversation server 130 provides (578) a uniform view of the conversation to a plurality of the participants.

Figure 6:
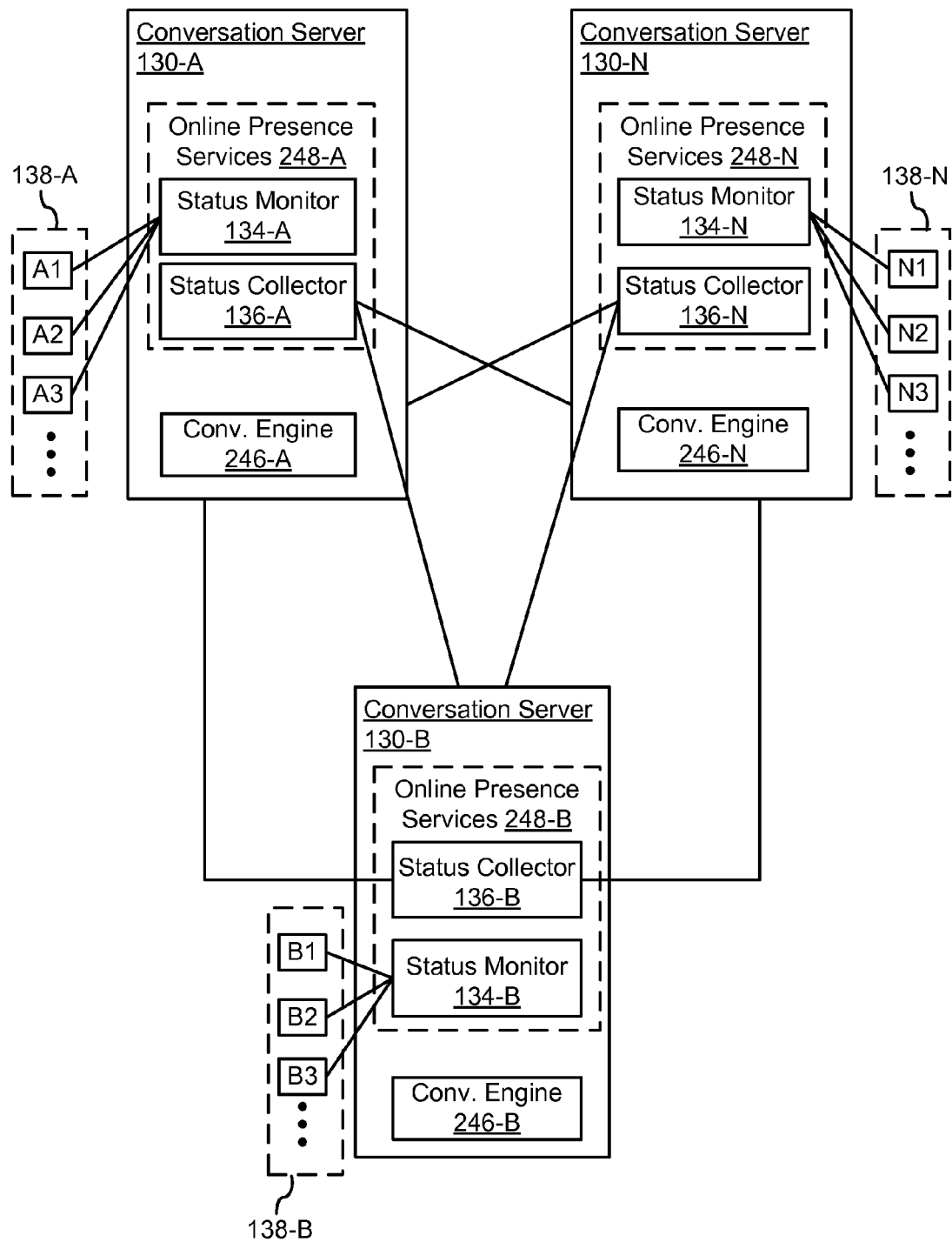
FIG. 6 is a block diagram of a plurality of linked conversation servers, with mechanisms for obtaining and distributing user online presence information, according to certain embodiments.

FIG. 6 is a block diagram illustrating an embodiment of a conversation system having a plurality of linked conversation servers 130, according to certain embodiments. FIG. 6 illustrates a logical coupling of conversation servers 130 to each other and to clients for monitoring and reporting the online status (presence) of the system's participants. While the exemplary conversation system illustrated in FIG. 6 includes three conversation servers 130-A, 130-B, and 130-N, it should be understood that the conversation system may include more or fewer conversation servers. Each conversation server 130 hosts conversations for a set 138 of participants (e.g., 112 in FIG. 1). For example, each conversation server 130 may host conversations initiated by hundreds or even thousands of participants. Conversation server 130-A is assigned a first set 138-A of participants; conversation server 130-B is assigned a second set 138-B of participants; and conversation server 130-N is assigned a third set 138-N of participants. Each conversation server 130 includes online presence services 248 (e.g., 248-A, 248-B, and 248-N), including a respective status monitor 134 (134-A, 134-B, 134-N) and a respective status collector 136 (136-A, 136-B, 136-N) which provide online presence information to a conversation engine 246 (246-A, 246-B, 246-N).

Whenever a participant changes online status (e.g., goes from offline to online, by logging into the conversation system), the change in status is detected by a respective status monitor 134 (e.g., a status monitor in the conversation server assigned to the participant). A status monitor 134 at the conversation server to which the participant is assigned receives a message or otherwise detects the change in online status of that participant to "online" (or "active," "busy," or whatever status is appropriate). Furthermore, a status collector 136 at the conversation server gathers the online status of the contacts in that participant's contact list 416. While some of the contacts in the participant's contact list may be assigned to the same conversation server, other contacts in the participant's contact list are assigned to other conversation servers.

The status collector 136 of the conversation server to which the participant is assigned gathers the online status of the participant's contacts, including those assigned to other conversation servers, and forwards at least a portion of the collected status information to the participant (i.e., to the client or system currently being used by the participant). In some embodiments, the status collector broadcasts requests for status information of the participant's contacts to the other conversation servers, and the conversation servers to which the contacts are assigned respond to the requests. In some other embodiments, the status collector determines the conversation servers to which the contacts are assigned and sends requests for status information to those conversation servers. In some embodiments, the assignments of participants to conversation servers may be determined by reference to an index of all participants, a copy of which may be stored in all of the conversation servers or a subset thereof.

For example, if a participant A1 of the first set 138-A of participants, assigned to conversation server 130-A, changes online status from offline to online, a client application at the client being used by the participant A1 sends a message to the conversation server 130-A with which participant A1 is associated announcing that participant A1 is online. Status monitor 134-A at conversation server 130-A receives the message and updates the status of the participant A1 to online. Status monitors 134 of other conversation servers either do not receive this message, or ignore it because the participant A1 is not assigned to those other conversation servers. Status collector 136-A at Conversation server 130-A obtains a list of the contacts for the participant A1 (e.g., by accessing contact list 416 for participant A1). Using that list of contacts, status collector 136-A gathers status information from the conversation servers to which the contacts are assigned. Thus, if a contact is assigned to conversation server 130-A, then status collector 136-A accesses the contact's status information stored at conversation server 130-A. If a respective contact is assigned to conversation server 130-B, then conversation server 130-A communicates with conversation server 130-B to get the status information for the respective contact. A similar procedure occurs if a respective contact is assigned to conversation server 130-C.

Figure 7:
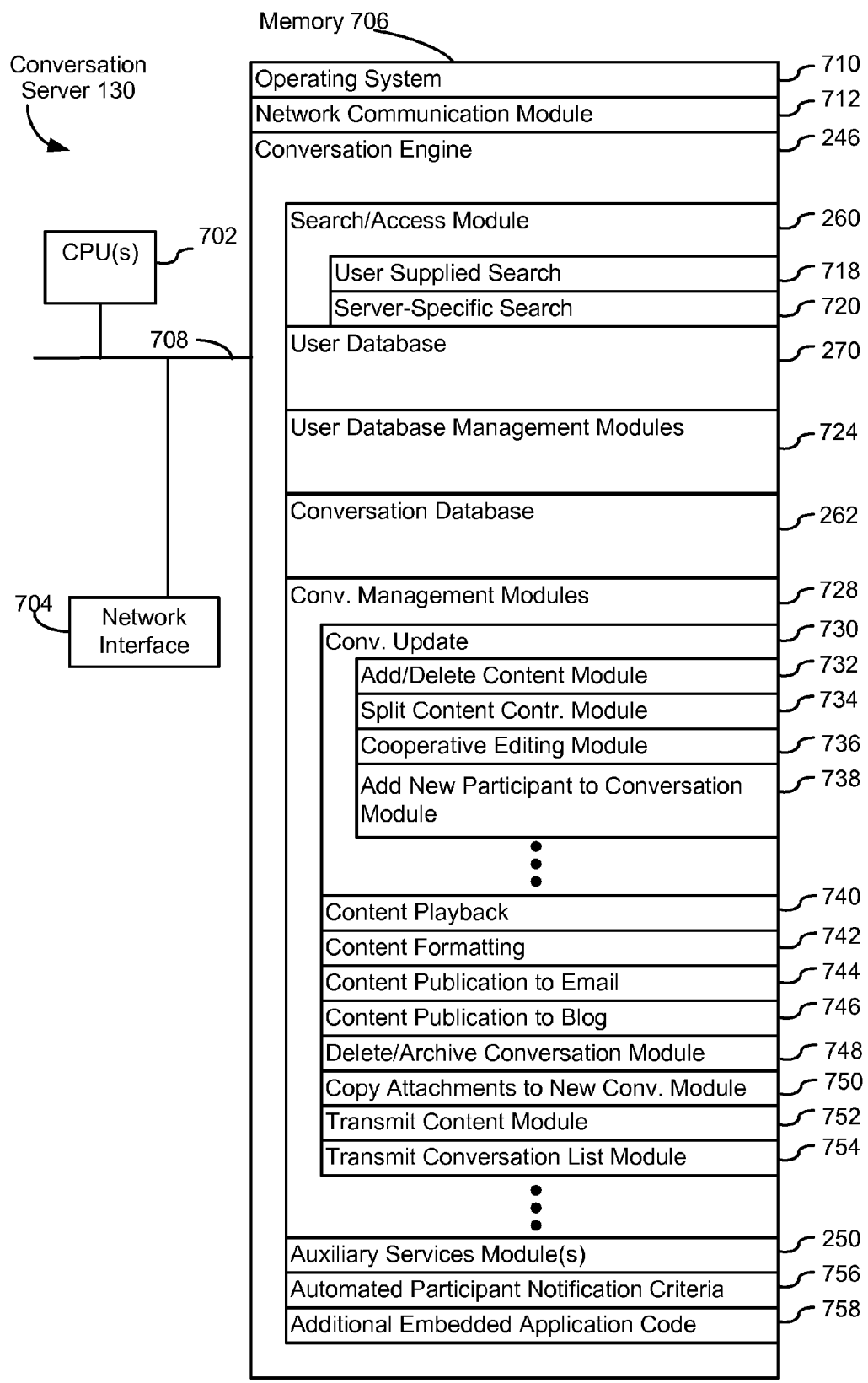
FIG. 7 is a block diagram of a conversation server for a conversation system, according to certain embodiments.

FIG. 7 is a block diagram illustrating a conversation server 130 in accordance with one embodiment. Conversation server 130 is a computer system including one or more processing units (CPUs) 702, one or more network or other communications interfaces 704, memory 706, and one or more communication buses 708 for interconnecting these components. Communication buses 708 may include circuitry (sometimes called a chipset) that interconnects and controls communications between system components. Conversation server 130 typically does not include a user interface, but in some embodiments conversation server 130 does include a user interface having a display device and a keyboard.

Memory 706 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 706 optionally includes one or more storage devices remotely located from the CPU(s) 702. Memory 706, or alternately the non-volatile memory device(s) within memory 706, includes a non-transitory computer readable storage medium. In some embodiments, memory 706 or the computer readable storage medium of memory 706 stores the following programs, modules and data structures, or a subset thereof:

- an operating system 710 that includes procedures for handling various basic system services and for performing hardware dependent tasks;
- a network communication module 712 that is used for connecting conversation server 130 to other computers via the one or more communication network interfaces 704 and one or more communication networks, such as the Internet, other wide area networks, local area networks, metropolitan area networks, and so on; and
- a conversation engine 246 that provides hosted conversation services on conversation server 130 for a plurality of users.

Conversation engine 246 may include the following modules, or a subset thereof:

- a search/access module 260, for performing searches of conversation database 262; the searches of conversation database 262 may include user-specified searches 718 as well as server-specified searches 720 (e.g., a search for conversations in a user's inbox or a search for a conversation associated with a particular webpage, as described in greater detail below with reference to method 1200);
- a user database 270, for storing information pertaining to users of the conversation system;
- user database management modules 724, for managing user database 270 (e.g., for creating new user records, and for updating existing user records);
- conversation database 262;
- conversation management modules 728, for managing conversation database 262; and
- auxiliary services module(s) 250; as noted above, each particular auxiliary service provided in a conversation system may be provided by modules within a conversation server 130, or by other servers.

In some embodiments, conversation management modules 728 include the following modules, or a subset thereof:

- a set of conversation update modules 730, for creating new conversations (e.g., creating a new conversation based on predefined parameters as described in greater detail below with reference to method 1100 or creating a new conversation based on a request for a conversation associated with a particular webpage when a conversation for the particular webpage does not already exist, as described in greater detail below with reference to method 1200) and/or updating a conversation with changes made by one or more participants, including one or more of: an add/delete content module 732, for adding or removing content from a conversation; a split content contribution module 734, for splitting a content contribution (e.g., 326 in FIG. 3A) in a conversation into two or more separate content contributions; a cooperative editing module 736, for enabling simultaneous editing of a conversation or a content contribution (unit of content) by a plurality of participants; and an add new participant to conversation module 738, for adding a new participant to a conversation;
- content playback module 740, for playing back edits to a conversation or document (or a user-specified portion of the conversation or document);
- content formatting module 742, for formatting content to match a configuration of a client; (the configuration of a client for a respective user may be specified by an client device ID/type 420, FIG. 4, of the user record 402 for the respective user);
- content publication to email module 744, for publishing content of a conversation to an email address; the email address may be specified by an email address 432, FIG. 4, of the user record 402 for the respective user;
- content publication to weblog ("blog") module 746 for publishing content of a conversation to a weblog; the URL or network location of the weblog may be specified by blog URL 430, FIG. 4, of the user record 402 for the respective user)
- delete/archive conversation module 748, for deleting or archiving a conversation from a user's inbox or conversation viewer;
- copy attachments to new conversation module 750, for copying attachments from one conversation to another conversation, without copying other content of the conversation;
- transmit conversation module 752, for transmitting content of a conversation to a client or to another conversation server (e.g., for delivery to a user/client serviced by the other conversation server);
- transmit conversation list module 754, for transmitting a list of conversations to a client or to another conversation server (e.g., for delivery to a user/client serviced by the other conversation server);
- automated participant notification criteria 756 indicating what events are to be reported to one or more automated participants (e.g., a transient table including notification criteria indicating the conditions under which an event such as the modification, creation, deletion of a conversation should be reported to one or more automated participants), and what information is to be provided in the notification (e.g., a notification that content has changed, a copy of the entire conversation or a predefined portion of the conversation, such as a modified content contribution, a parent of the modified content contribution, siblings of the modified content contribution and/or children of the modified content contribution, etc.); and additional embedded application code 758 (e.g., application boilerplate) which is, optionally, provided to clients in conjunction with embedded application code received from one or more application servers so as to enable the embedded application to run within the conversation.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 706 may store a subset of the modules and data structures identified above. Furthermore, memory 706 may store additional modules and data structures not described above.

Although FIG. 7 shows a conversation server, FIG. 7 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 7 could be implemented on single servers and single items could be implemented by one or more servers. The actual number of servers used to implement a conversation server system and how features are allocated among them will vary from one implementation to another, and may depend in part on the amount of data traffic that the system must handle during peak usage periods as well as during average usage periods.

Figure 8:
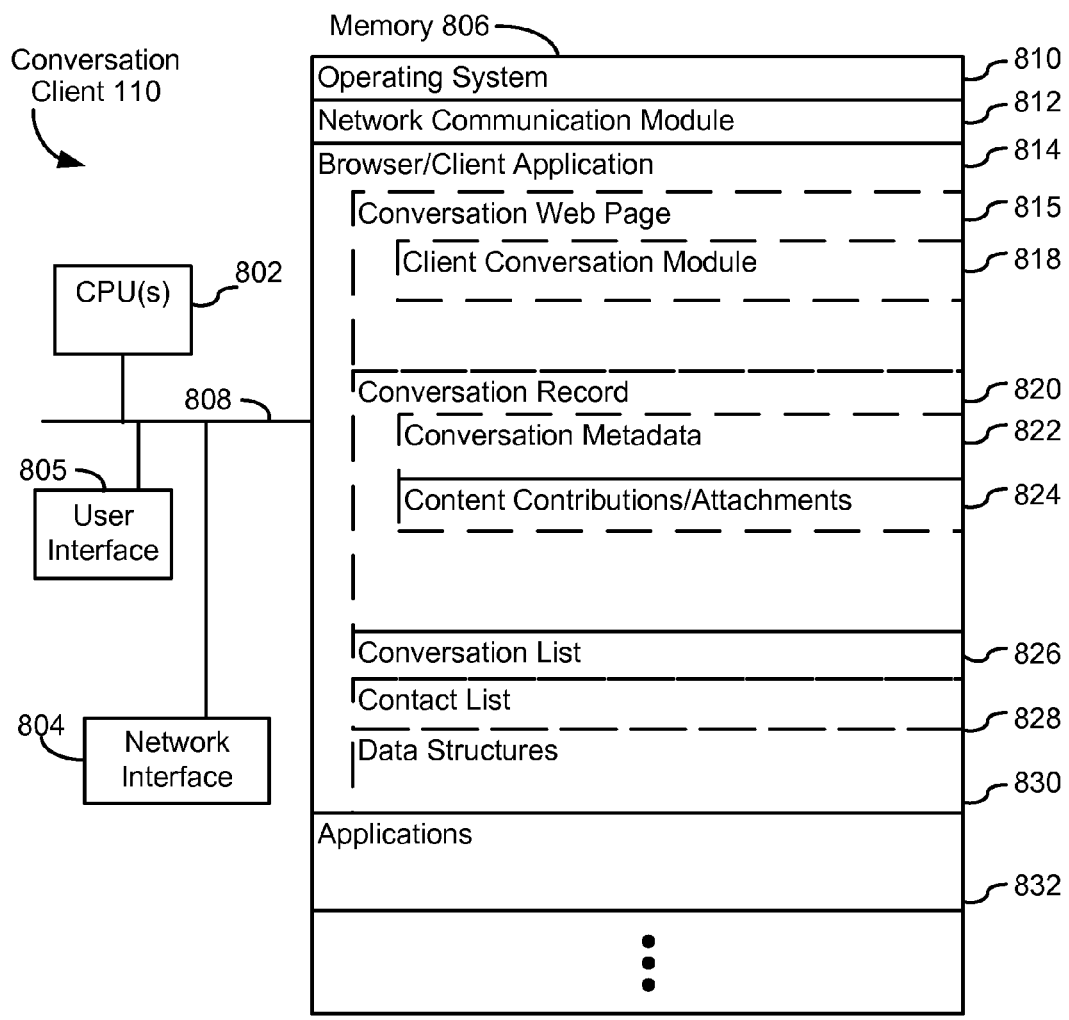
FIG. 8 is a block diagram of a client having a user who participates in one or more conversations in a conversation system, according to certain embodiments.

FIG. 8 is a block diagram of a client having a user who participates in one or more conversations in a conversation system, according to certain embodiments. Client 110 is a computer system or device including one or more processing units (CPUs) 802, one or more network or other communications interfaces 804, memory 806, and one or more communication buses 808 for interconnecting these components. Communication buses 808 may include circuitry (sometimes called a chipset) that interconnects and controls communications between system components. Client 110 typically includes a user interface 805. In some embodiments, the user interface includes a display device, a keyboard and a pointer device (not shown), while in other embodiments (e.g., a cell phone or personal digital assistant) the user interface includes a touch screen display.

Memory 806 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 806 optionally includes one or more storage devices remotely located from the CPU(s) 802. Memory 806, or alternately the non-volatile memory device(s) within memory 806, includes a non-transitory computer readable storage medium. In some embodiments, memory 806 or the computer readable storage medium of memory 806 stores the following programs, modules and data structures, or a subset thereof:

- an operating system 810 that includes procedures for handling various basic system services and for performing hardware dependent tasks;
- a network communication module 812 that is used for connecting the client 110 to other computers via the one or more communication network interfaces 804 and one or more communication networks, such as the Internet, other wide area networks, local area networks, metropolitan area networks, and so on;
- a browser or other client application 814 for viewing and interacting with web pages and other content, including conversations in a conversation system and/or webpages that include rendering instructions for rendering an embedded conversation in the webpage, as described in greater detail below with reference to method 1200;
- optionally, a conversation web page 815, which is received from a conversation server (e.g., shown in FIG. 7) and is displayed using the browser or other client application 814 (e.g., a web-based conversation application for viewing conversations associated with a particular communications account within a webpage of a web browser);
- optionally, a conversation record 820, which contains the content of a conversation downloaded from a conversation server, some or all of which may be displayed in conversation web page 815;
- optionally, a conversation list 826, which is a list of conversations downloaded from a conversation server (e.g., in response to a query from a user of the client or as part of a user interface displayed within conversation web page 815);
- optionally, a contact list 828, or a portion of the contact list of the user of the client; the contact list may be maintained separately from or in conjunction with a conversation system;
- optionally, other data structures 830 (e.g., a list of labels defined by the user); and
- optionally, other applications 832 for execution by client 110 (e.g., a stand-alone conversation application for viewing conversations associated with one or more communications accounts of a user of the client).

In some embodiments, the conversation web page 815 includes a client conversation module 818 or other client assistant that is embedded in web page 815. Client conversation module 818 comprises executable instructions that are executed by client 110; for example, client conversation module 818 may include instructions that are executed by a virtual machine (e.g., a Java® virtual machine) that is part of browser 814. Conversation web page 815 includes a conversation user interface having icons, which when activated by a user, execute various tasks to enable a user to request a list of conversations, select a conversation for display, view various portions of a conversation, participate in the conversation (e.g., by adding content to or editing content of the conversation), start new conversations, download attachments, and so on. Icons in the conversation user interface may function as links to executable procedures and instructions in client conversation module 818. The aforementioned conversation record 820 and conversation list 826 may, in some embodiments, be downloaded in response to instructions sent by a client conversation module 818, or other client assistant embedded in web page 815, to a conversation server.

Conversation record 820 comprises a client version or subset of conversation record 310, described above with respect to FIG. 3A, for a respective conversation. Client conversation record 820 includes conversation metadata 822 needed by the client (e.g., a list of participants and their online status) and content contributions 824 that are the content of the conversation. Depending on the implementation and the capabilities of client 110, conversation record 820 optionally includes the attachments, if any, of the conversation. Thus, attachments may be downloaded to some clients (e.g., desktop and laptop computers), but not to others (e.g., mobile phones and personal digital assistants). In some embodiments, the attachments of the conversation are not downloaded until they are requested by the user. Alternately, in some embodiments, thumbnail images and/or snippets (e.g., selected text, if any) of some or all the attachments are automatically downloaded to client 110 along with the primary content of the conversation, and the full content of the attachments is downloaded to client 110 only upon user request.

Each of the above identified modules corresponds to a set of instructions for performing the functions described above. The above identified modules or programs (i.e., sets of instructions) need not be implemented as separate software programs, procedures or modules, and thus various subsets of these modules may be combined or otherwise re-arranged in various embodiments. In some embodiments, memory 806 or the computer readable storage medium of memory 806 may store a subset of the modules and data structures identified above. Furthermore, memory 806 or the computer readable storage medium of memory 806 may store additional modules and data structures not described above.

Figure 9:
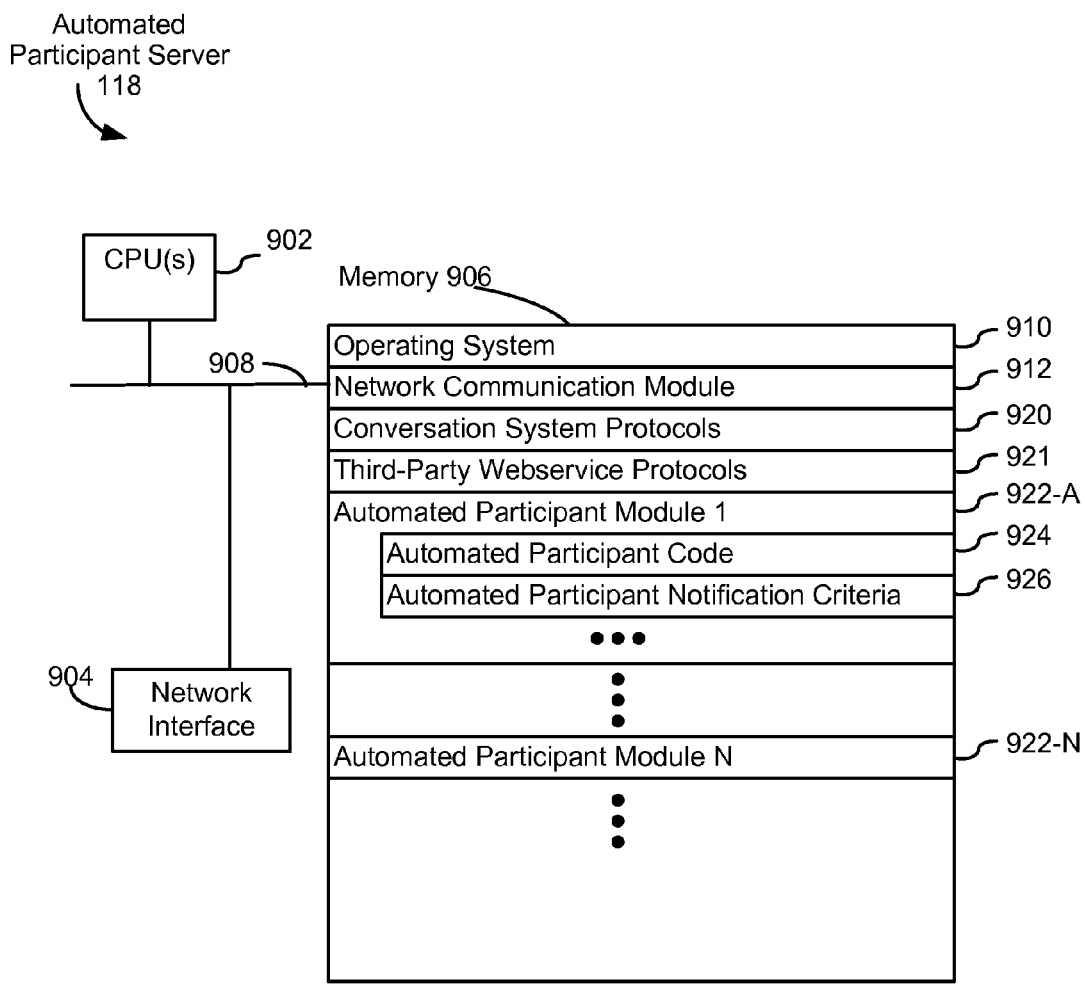
FIG. 9 is a block diagram of an automated participant server for a conversation system, according to certain embodiments.

FIG. 9 is a block diagram illustrating an automated participant server 118 in accordance with one embodiment. Automated participant server 118 is a computer system including one or more processing units (CPUs) 902, one or more network or other communications interfaces 904, memory 906, and one or more communication buses 908 for interconnecting these components. Communication buses 908 may include circuitry (sometimes called a chipset) that interconnects and controls communications between system components. Automated participant server 118 typically does not include a user interface, but in some embodiments automated participant server 118 does include a user interface having a display device and a keyboard.

Memory 906 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 906 optionally includes one or more storage devices remotely located from the CPU(s) 902. Memory 906, or alternately the non-volatile memory device(s) within memory 906, includes a non-transitory computer readable storage medium. In some embodiments, memory 906 or the computer readable storage medium of memory 906 stores the following programs, modules and data structures, or a subset thereof:
- an operating system 910 that includes procedures for handling various basic system services and for performing hardware dependent tasks;
- a network communication module 912 that is used for connecting automated participant server 118 to other computers via the one or more communication network interfaces 904 and one or more communication networks, such as the Internet, other wide area networks, local area networks, metropolitan area networks, and so on;
- conversation system protocols 920 for interacting with conversations on a conversation system as an automated participant;
- third-party webservice protocols 921 for interacting with third-party webservices (e.g., a protocol compliant with an application-programming interfaces for a webservice, or simply instructions for traversing publicly available information from a third-party webservice and identifying information to be communicated to the conversation system); and
- one or more automated participant modules 922, each module 922 for performing operations as a respective automated participant in a conversation, the automated participant module 922 including automated participant code 924 which determines the operations performed by the automated participant and automated participant notification criteria 926 to be provided to the conversation server 130 so as to indicate what events are to be reported to the automated participant (e.g., a transient table including notification criteria indicating the conditions under which an event, such as the modification, creation, or deletion of a conversation, should be reported to one or more automated participants), and what information is to be provided in the notification (e.g., a notification that content has changed, a copy of the entire conversation or a predefined portion of the conversation, such as a modified content contribution, a parent of the modified content contribution, siblings of the modified content contribution and/or children of the modified content contribution, etc.). Notification criteria 926 can be modified (e.g., restricted to fewer notifications or notifications including smaller amounts of content) as necessary to manage (e.g., reduce) the bandwidth and CPU usage of automated participant server 118 and conversation server 130.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 906 may store a subset of the modules and data structures identified above. Furthermore, memory 906 may store additional modules and data structures not described above.

Although FIG. 9 shows an automated participant server, FIG. 9 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 9 could be implemented on single servers and single items could be implemented by one or more servers. The actual number of servers used to implement an automated participant server system and how features are allocated among them will vary from one implementation to another, and may depend in part on the amount of data traffic that the system must handle during peak usage periods as well as during average usage periods. Additionally automated participant server 118 could be combined with another server that performs other communication related operations (e.g., automated participant server 118 described above may also include modules which perform functions typically associated with email servers or weblog servers).

Figure 10:
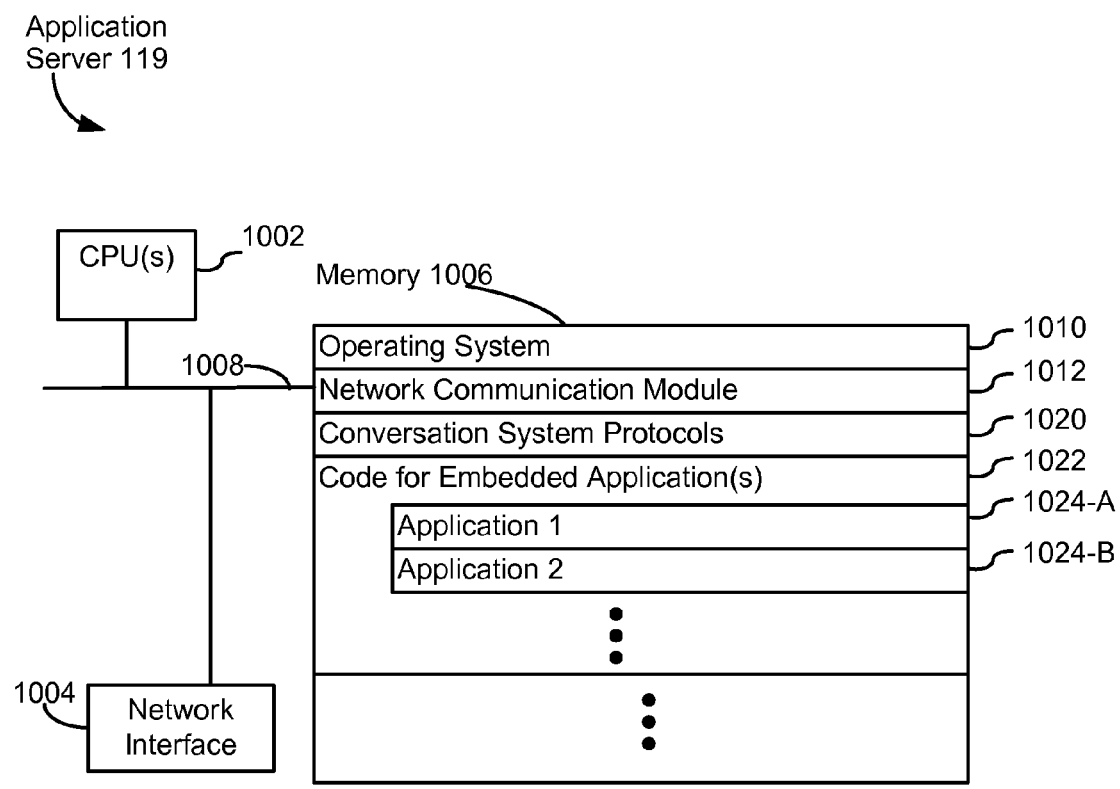
FIG. 10 is a block diagram of an application server for a conversation system, according to certain embodiments.

FIG. 10 is a block diagram illustrating an application server 119 in accordance with one embodiment. Application server 119 is a computer system including one or more processing units (CPUs) 1002, one or more network or other communications interfaces 1004, memory 1006, and one or more communication buses 1008 for interconnecting these components. Communication buses 1008 may include circuitry (sometimes called a chipset) that interconnects and controls communications between system components. Application server 119 typically does not include a user interface, but in some embodiments application server 119 does include a user interface having a display device and a keyboard.

Memory 1006 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1006 optionally includes one or more storage devices remotely located from the CPU(s) 1002. Memory 1006, or alternately the non-volatile memory device(s) within memory 1006, includes a non-transitory computer readable storage medium. In some embodiments, memory 1006 or the computer readable storage medium of memory 1006 stores the following programs, modules and data structures, or a subset thereof:

- an operating system 1010 that includes procedures for handling various basic system services and for performing hardware dependent tasks;
- a network communication module 1012 that is used for connecting the application server 119 to other computers via the one or more communication network interfaces 1004 and one or more communication networks, such as the Internet, other wide area networks, local area networks, metropolitan area networks, and so on;
- conversation system protocols 1020 for receiving requests from clients and or conversation servers requesting code for embedded applications; and
- code for embedded applications 1022, including code for one or more embedded applications 1024, wherein the code for the embedded applications can be updated at application server 119 by a programmer or application owner.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 1006 may store a subset of the modules and data structures identified above. Furthermore, memory 1006 may store additional modules and data structures not described above.

Although FIG. 10 shows a application server, FIG. 10 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 10 could be implemented on single servers and single items could be implemented by one or more servers. The actual number of servers used to implement an application server system and how features are allocated among them will vary from one implementation to another, and may depend in part on the amount of data traffic that the system must handle during peak usage periods as well as during average usage periods.

Other Applications

Another application that may be associated with the conversation server hosting a respective conversation includes a contextual spell checker and correction application. Such an application can be used to find common misspellings, and to disambiguate intentionally defined words. Such an application may use an error model to determine if an work is spelled or used correctly. The model may find common errors based on letter reversal, phonetic similarity, location in a conversation or letter, or using other means. The application may provide on-the-fly, context based text correction. In some embodiments, the application provides a user-specific overlay of words that a user frequently uses or that the user has defined. In some embodiments, the application may insert a tag with a suggestion for a word that it considers to be incorrectly spelled, such that any participant (not just the author) can address and correct the word, if necessary.

Another application that may be associated with the conversation server hosting a respective conversation includes a contextual name display, using context-dependent disambiguation. In some embodiments, this disambiguation may provide space efficiency when displaying names. For example, a close friend or work colleague may be displayed using a first name only or a picture, whereas a stranger may be displayed with full name, title, etc. A set of rules (defined by the system or by the user or both) may be used to determine who to display and in what manner.

Another application that may be associated with the conversation server hosting a respective conversation includes a language translation (machine translation) application. This machine translation application may use the spell checking and/or a context sensitive dictionary to translate between languages. In some embodiments, these (and other) applications use an application protocol interface (API) to interact with the conversation server hosting the conversation. In some embodiments, the application allows a participant to reserve a namespace for that participant's personal applications, which the participant may share with other participants.

Figure 11A:
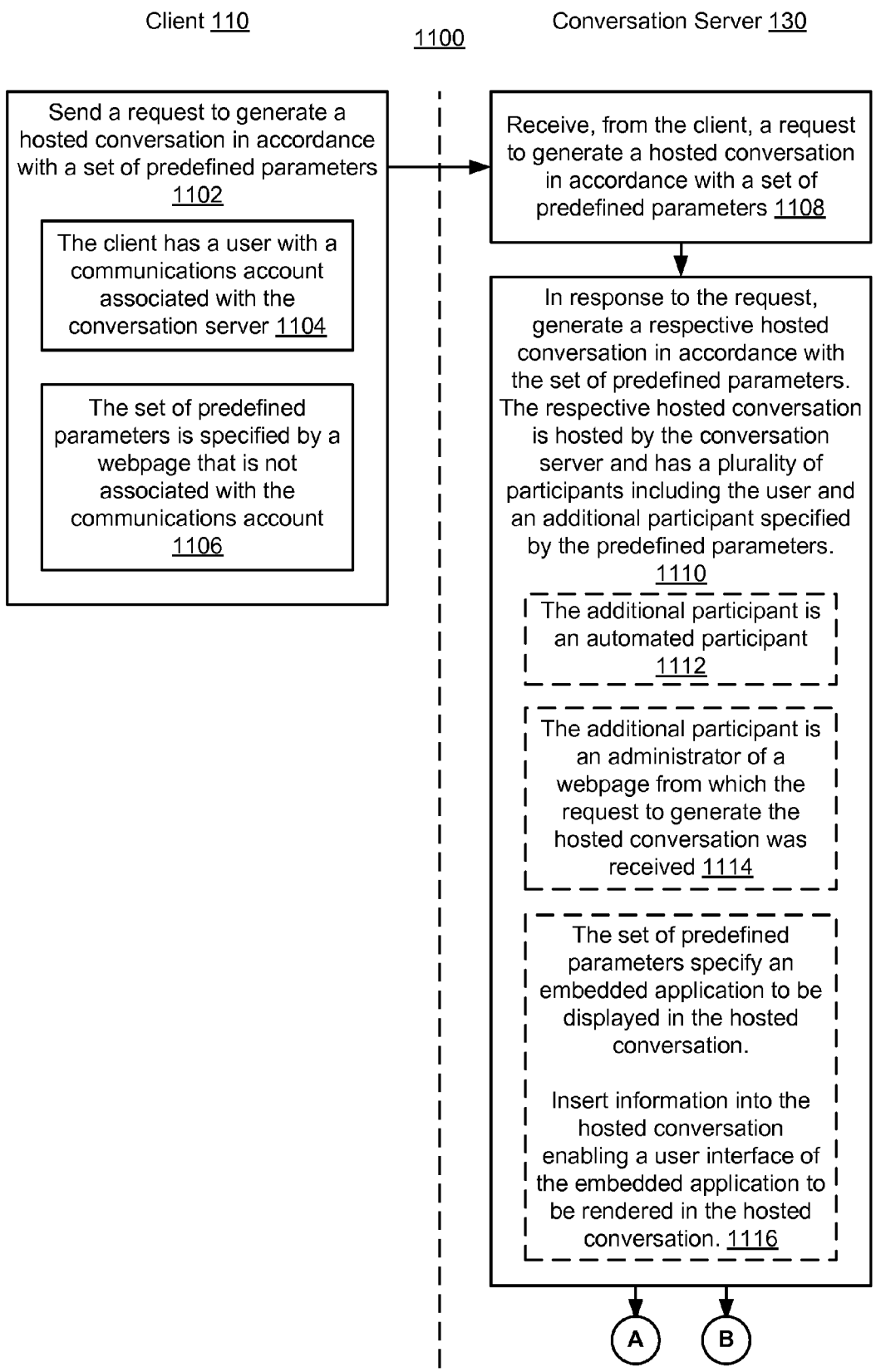
FIGS. 11A-11B are flowcharts representing a method for enabling a hosted conversation to be automatically generated in accordance with a set of predefined parameters according to certain embodiments.
Figure 11B:
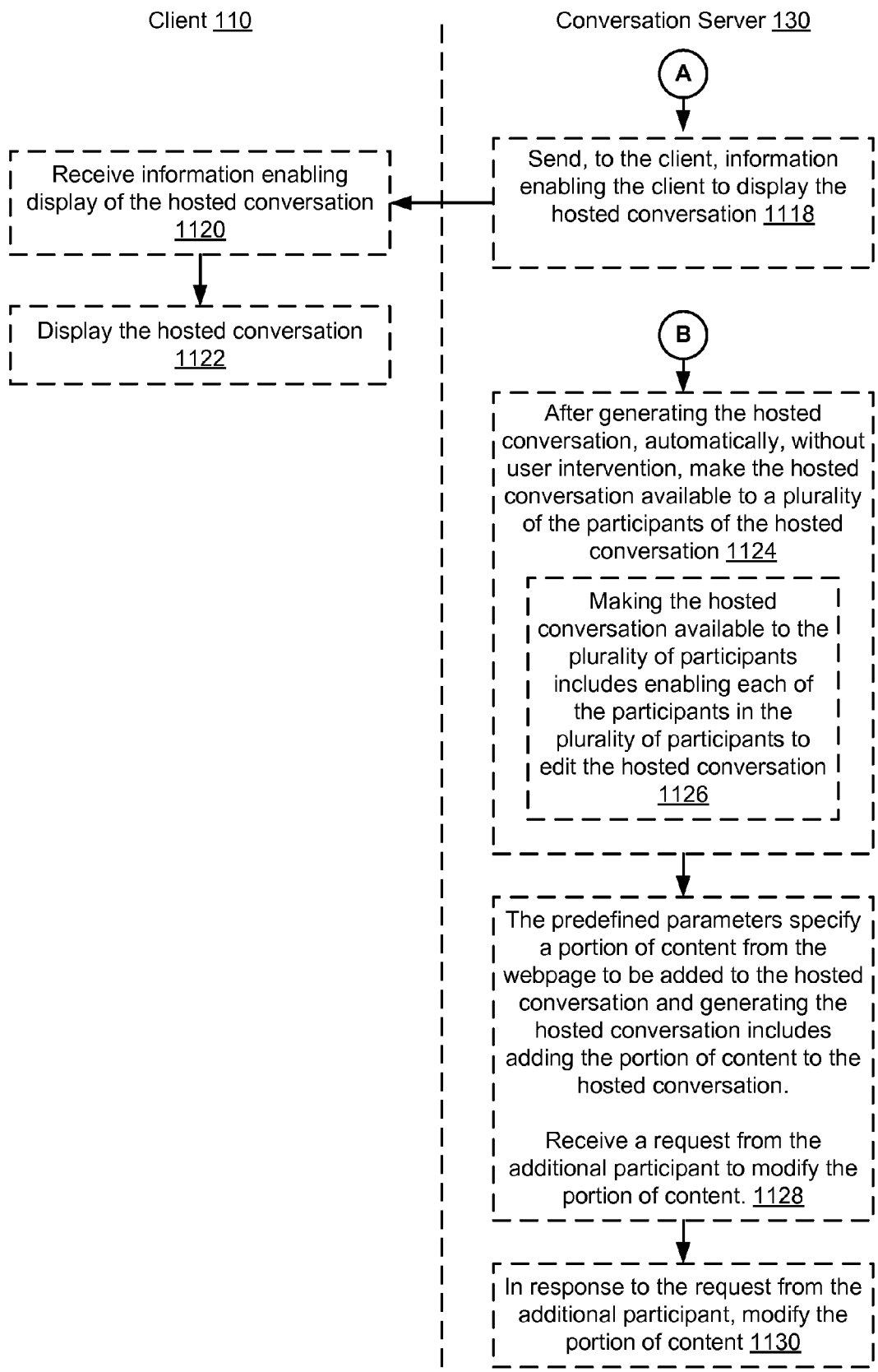
Figure 12A:
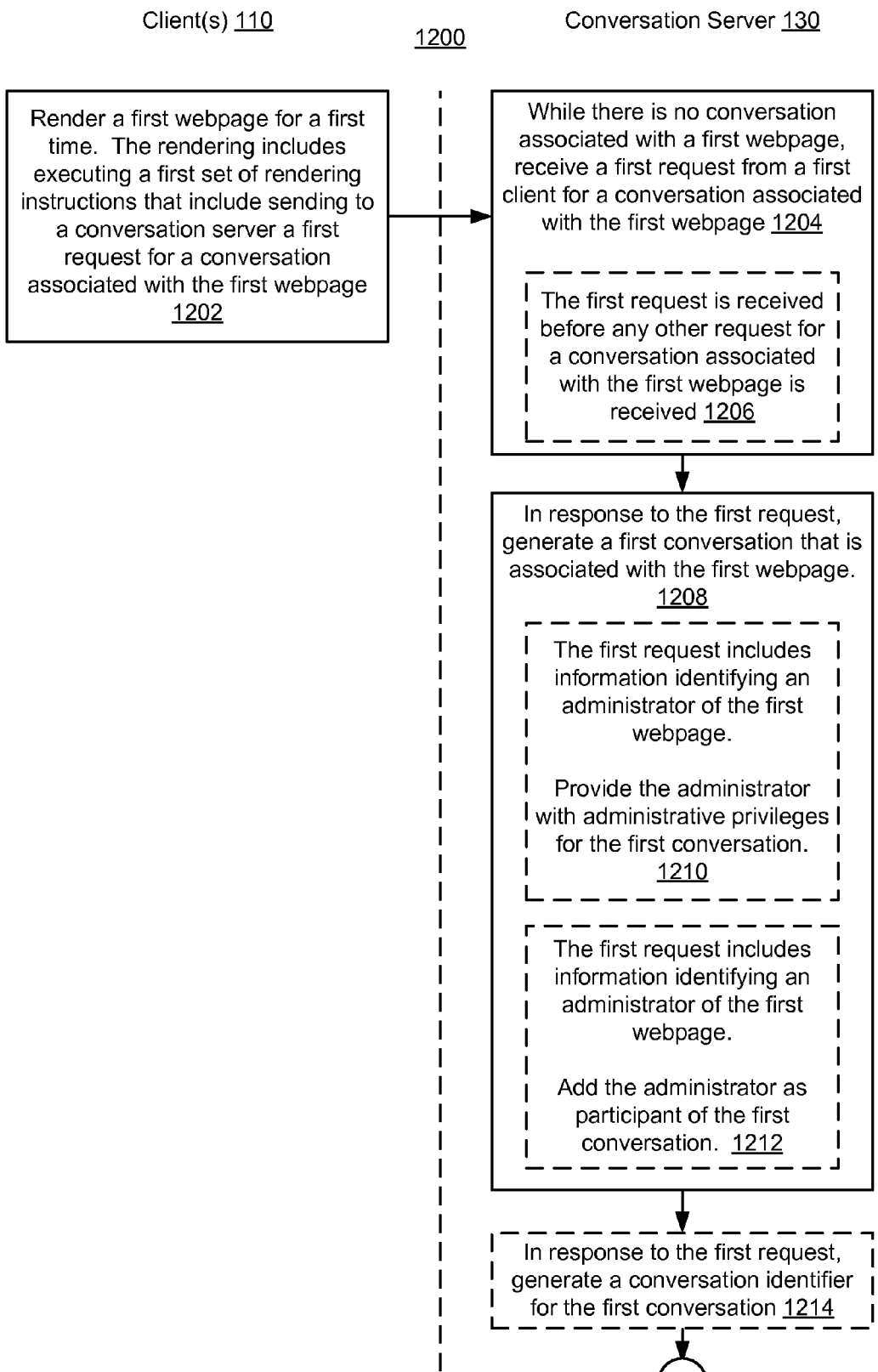
FIGS. 12A-12D are flowcharts representing a method for generating a conversation associated with a webpage, according to certain embodiments.
Figure 12B:
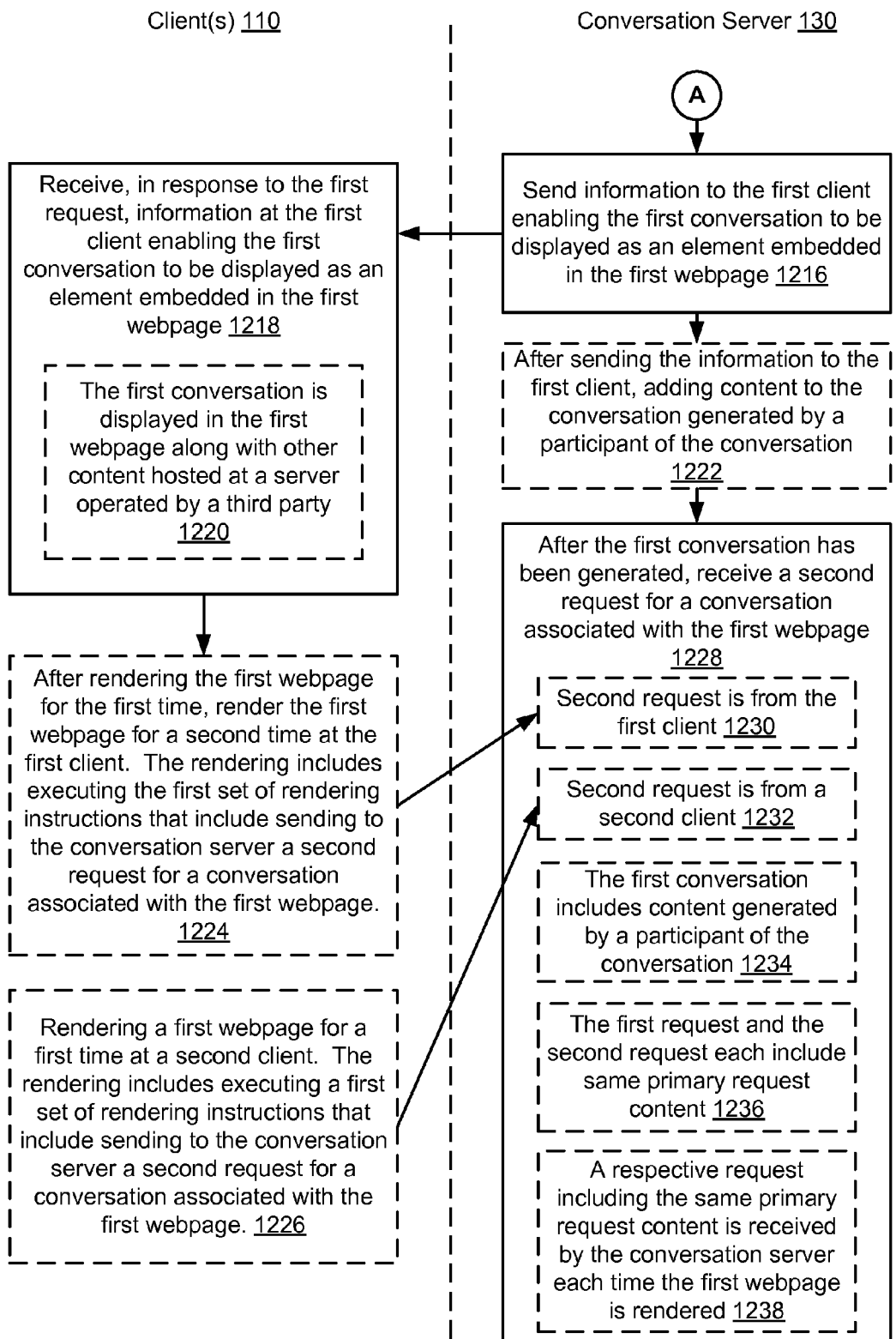
Figure 12C:
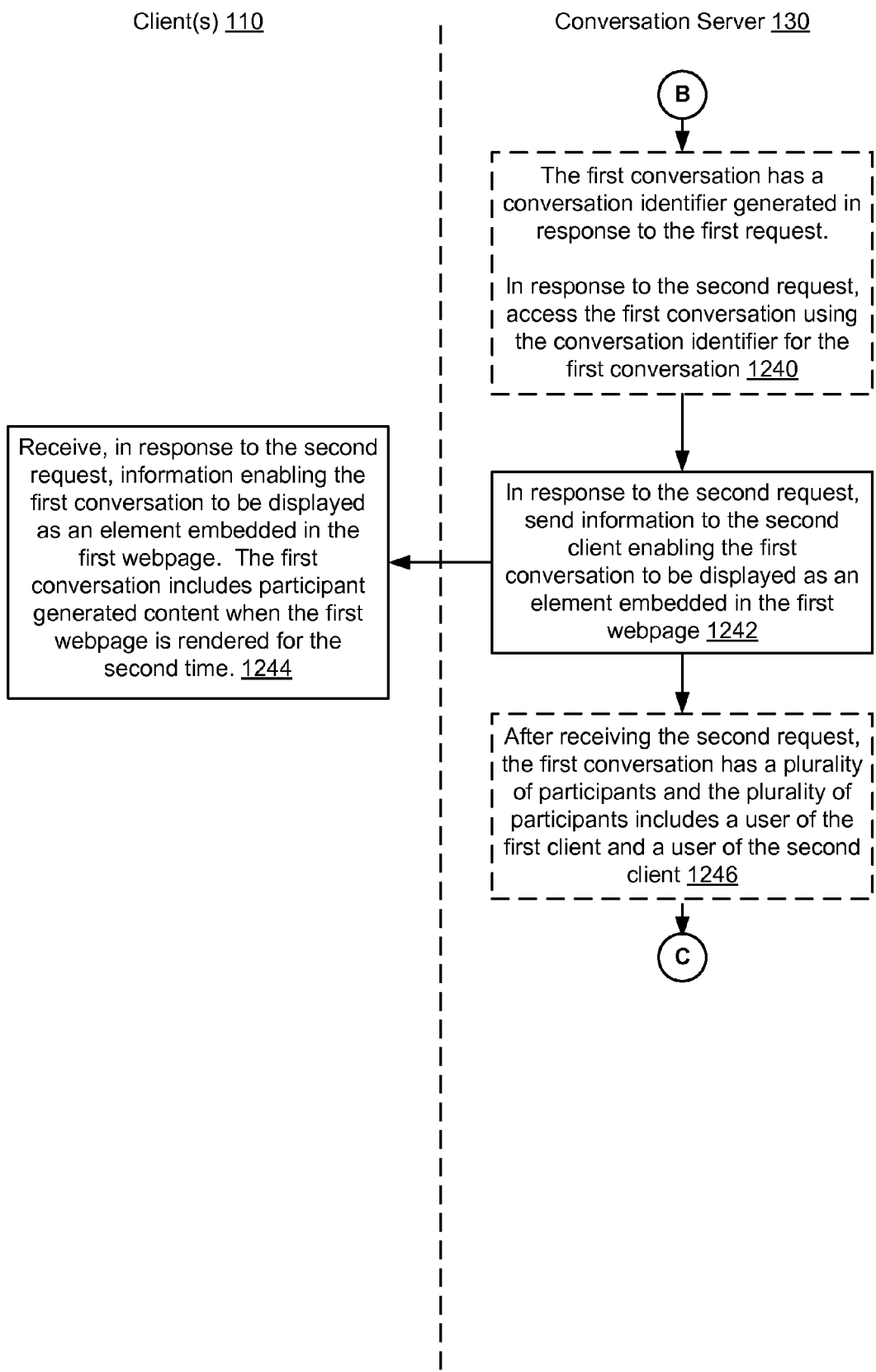
Figure 12D:
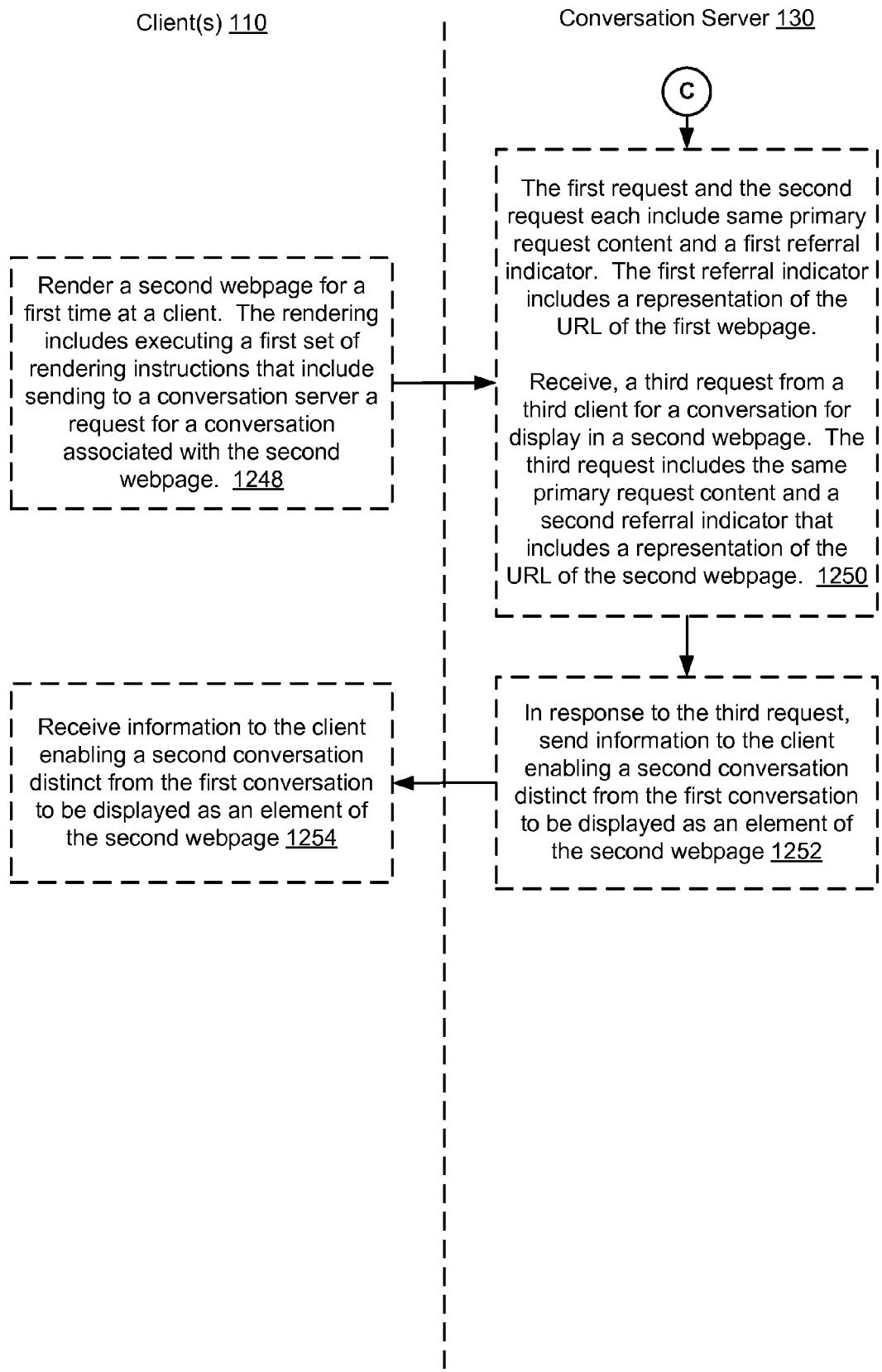

FIGS. 11A-11B are flowcharts representing a method 1100 for enabling a hosted conversation to be automatically generated in accordance with a set of predefined parameters, according to some embodiments. These methods are governed by instructions that are stored in a non-transitory computer readable storage medium and that are executed by one or more processors of one or more servers (e.g., conversation server 130), clients 110, and/or automated participant servers 118. Each of the operations shown in FIGS. 11A-11B corresponds to instructions stored in a non-transitory computer memory or computer readable storage medium. The computer readable storage medium typically includes a magnetic or optical disk storage device, solid state storage devices such as Flash memory, or other non-volatile memory device or devices. The computer readable instructions stored on the computer readable storage medium are in source code, assembly language code, object code, or other instruction format that is executed or interpreted by one or more processors.

A client 110 sends (1102) a request to conversation server 130 to generate a hosted conversation in accordance with a set of predefined parameters. Client 110 has (1104) a user with a communications account associated with conversation server 130. In some embodiments, the user has been authenticated for the communications account (e.g., the user has "logged in" or "signed in"). For example, the client is a laptop computer and a user with a communications account has signed into the communications account (e.g., a Google account for accessing one or more web based services such as Gmail, Google calendars, Google reader, etc.). The set of predefined parameters in accordance with which the hosted conversation is generated is (1106) specified by a webpage that is not associated with the communications account. For example, while the user is visiting a webpage (e.g., a news webpage) that is not associated with the user's communications account, the user selects a button (e.g., an affordance displayed on the webpage or in a toolbar of a browser application) that causes a request to be sent to the conversation server associated with the user's communications account; the request includes parameters specified by the webpage (e.g., code embedded in or otherwise associated with the webpage).

Conversation server 130 receives (1108), from client 110, the request to generate a hosted conversation in accordance with the set of predefined parameters (e.g., the parameters specified by code embedded in or otherwise associated with the webpage that the user was visiting). In some embodiments, in response to the request, conversation server 130 generates (1110) a respective hosted conversation in accordance with the set of predefined parameters. The respective hosted conversation is hosted by conversation server 130 and has a plurality of participants including the user and an additional participant specified by the predefined parameters. This hosted conversation is not merely a draft or other potential conversation, rather the hosted conversation is "live." In other words, the hosted conversation generated by conversation server 130 has a plurality of participants who are able to edit, view, search for, and otherwise interact with the hosted conversation. In some embodiments the hosted conversation shows up in a list of recently created/edited conversations (e.g., an "inbox") for each of the participants, with a creation time stamp and/or date stamp that indicates the date/time that the hosted conversation was generated by conversation server 130 as the creation time for the hosted conversation.

In some embodiments, the additional participant is (1112) an automated participant (e.g., either a general purpose automated participant or a special-purpose automated participant, as described in greater detail above). The automated participant may serve many different purposes in the hosted conversation. For example, the set of predefined parameters may specify a portion of the webpage (e.g., text, images, video, etc.) that is to be included in the hosted conversation. In these embodiments, the automated participant may be used to keep the information from the webpage up to date. For example, a news article may have corrections made by the author as errors are identified or facts/images are updated for a breaking news story published on the webpage. As another example, if the webpage includes a current deal or offer, the automated participant may update the hosted conversation as necessary to keep the deal or offer up to date and/or remove the offer once it has expired.

In some embodiments, the additional participant is (1114) an administrator of a webpage from which the set of predefined parameters used request to generate the hosted conversation was received. For example, a non-automated participant (e.g., a human participant) may be added to the hosted conversation so that the non-automated participant can monitor and/or moderate discussions that occur based on the content from the webpage that was added to the hosted conversation. Alternatively an automated participant could monitor and/or moderate discussions that occur within a hosted conversation, however such tasks are typically performed by a non-automated participant.

In some embodiments, the set of predefined parameters in accordance with which the hosted conversation is generated specify (1116) an embedded application to be displayed in the hosted conversation, and conversation server 130 inserts information into the hosted conversation enabling a user interface of the embedded application to be rendered in the hosted conversation. For example, conversation server 130 may insert executable code that enables a widget or other application to be displayed in a frame (e.g., an iFrame) within the hosted conversation. Alternatively, conversation server 130 inserts information indicating a location from which executable code for running a widget can be requested/retrieved (e.g., an application server 119 in FIG. 1). Exemplary embedded applications enable the display of multimedia content (e.g., video, audio, images, etc.) and/or interactive user interfaces (e.g., voting widgets, maps, video/audio playback or editing, etc.) within the hosted conversation.

In some embodiments, conversation server 130 sends (1118) client 110 information enabling client 110 to display the hosted conversation. Client 110 receives (1120) the information enabling display of the hosted conversation and displays (1122) the hosted conversation to the user. Thus, after generating a hosted conversation in accordance with predefined parameters, where the hosted conversation includes multiple participants, the generated hosted conversation is displayed on the device from which the request to generate the hosted conversation was received. For example, a user navigates to a webpage that includes a "hosted conversation" button and selects the "hosted conversation" button, which sends a request to conversation 130 to generate a hosted conversation. Conversation server 130 receives the request and generates a hosted conversation including a portion of the content of the webpage, adds the user and an administrator as participants in the hosted conversation and then sends a representation of the hosted conversation to the client for display to the user. When the hosted conversation is displayed at the client, the user may view and/or make modifications to the hosted conversation.

In some embodiments, after generating the hosted conversation, conversation server 130 automatically, without user intervention, makes (1124) the hosted conversation available to a plurality of the participants of the hosted conversation. In other words, as described above, the hosted conversation is "live" when it is created and is not merely a draft. For example, after being generated the hosted conversation may be indexed and made available/sent to all participants. In some embodiments, making the hosted conversation available to the plurality of participants includes enabling (1126) each of the participants in the plurality of participants to edit the hosted conversation (e.g., participants may add to content, remove content or edit existing content of the hosted conversation). In various embodiments, the participants can add content to the hosted conversation; add messages to the hosted conversation; and/or edit content already present in the hosted conversation. In some embodiments, participants add separate content units to the hosted conversation. In other embodiments, participants are also able to supplement, modify or delete content units added by other users. In embodiments where participants are able to edit content units created by other participants, conflicting edits (e.g., when one participant modifies content deleted by another participant) are possible. Conflicting edits to hosted conversations or content units within the hosted conversations are handled using concurrency control procedures, such as those described in greater detail with reference to U.S. patent application Ser. No. 12/729,107, filed on Mar. 22, 2010, titled "System and Method for Editing a Conversation in a Hosted Conversation System," which is hereby incorporated by reference in its entirety.

In some embodiments, the predefined parameters specify a portion of content (e.g., text, images, video, etc.) from the webpage to be added to the hosted conversation, and generating the hosted conversation includes adding the portion of content to the hosted conversation. After the conversation has been generated, conversation server 130 receives (1128) a request from the additional participant (e.g., an automated participant specified by the predefined parameters) to modify the portion of content. In some of these embodiments, in response to the request from the additional participant to modify the portion of content, conversation server 130 modifies (1130) the portion of content. For example, an automated participant could be used to keep the portion of the content (e.g., a deal or news story) up to date by changing the portion of the content as corresponding content on the webpage changes, as described in greater detail above. In some embodiments, the hosted conversation includes first content received from the user and second content received from the additional participant. In other words, the hosted conversation can be edited by any of the participants, and thus both the user and the additional participant can add content to the hosted conversation.

Note that details of other processes described herein with respect to methods 500 or 1200 (e.g., FIGS. 5A-5E or 12A-12D, respectively) are also applicable in an analogous manner to method 1100 described above. For example, the conversation described above with reference to method 1100 may have one or more of the characteristics of the various conversations described herein with reference to methods 500 or 1200. For brevity, these details are not repeated here.

FIGS. 12A-12D are flowcharts representing a method 1200 for generating a conversation associated with a webpage, according to some embodiments. These methods are governed by instructions that are stored in a non-transitory computer readable storage medium and that are executed by one or more processors of one or more servers (e.g., conversation server 130), clients 110, and/or automated participant servers 118. Each of the operations shown in FIGS. 12A-12D may correspond to instructions stored in a non-transitory computer memory or computer readable storage medium. The computer readable storage medium typically includes a magnetic or optical disk storage device, solid state storage devices such as Flash memory, or other non-volatile memory device or devices. The computer readable instructions stored on the computer readable storage medium are in source code, assembly language code, object code, or other instruction format that is executed or interpreted by one or more processors.

A client 110 (e.g., a first client) renders (1202) a first webpage for a first time. The rendering includes executing a first set of rendering instructions that include sending to a conversation server a first request for a conversation (e.g., a hosted conversation hosted by conversation server 130) associated with the first webpage. In some embodiments, the rendering is the first time that the first webpage has been rendered by any client. In some embodiments, the rendering is the first time that the first webpage has been rendered by the first client. As one illustrative example, the conversation may be for use by the webpage as a comment system (e.g., the conversation is to be rendered in a frame in the webpage and users can comment on the content of the webpage by modifying the conversation either within the webpage or outside of the webpage, and the comments are added to the conversation as it is rendered in the webpage).

Conversation server 130 receives (1204) the first request from the client for the conversation associated with the first webpage while there is no conversation associated with the first webpage. In some embodiments, the first request is received (1206) before any other request for a conversation associated with the first webpage is received (e.g., the first request is generated the first time the page is loaded). For example, conversation server 130 receives a request for a conversation associated with a webpage associated with the URL www.example.com. After receiving the request, conversation server 130 determines whether there is already a conversation associated with the webpage (e.g., by searching an index of conversations/conversation IDs using a hash of the URL of the website, as described in greater detail above with reference to FIG. 3D). If conversation server 130 does not find a conversation that is associated with the webpage, either because no such conversation has been created or because a previously created conversation associated with the webpage has been deleted, conversation server 130 generates a conversation associated with the webpage, as described in greater detail below.

Thus, in response to the first request conversation server 130 generates (1208) a first conversation that is associated with the first webpage. In some embodiments, the first request includes information identifying an administrator of the first webpage; and conversation server 130 provides (1210) the administrator with administrative privileges for the first conversation. In some embodiments a parameter in the rendering instructions identifies an owner/administrator for the webpage/conversation. In some embodiments, the first request includes information (e.g., a request parameter) identifying an administrator of the first webpage; and conversation server 130 adds (1212) the administrator as participant of the first conversation (e.g., a participant with special administrative privileges such as deleting and/or renaming the conversation or adding and/or removing other participants from the conversation). Continuing the example from above, a creator of the webpage at www.example.com can specify (e.g., by modifying the code that is executed when the webpage at www.example.com is rendered) that the conversation associated with the webpage include a particular user (e.g., administrator@example.com) as an administrator of the conversation. Subsequently, when first request specified by the webpage includes information (e.g., a request parameter) indicating that administrator@example.com is to be added as an administrator of the conversation received by conversation server 130, administrator@example.com is added to the newly created conversation and given administrative privileges.

In some embodiments, conversation server 130 also generates (1214), in response to the first request, a conversation identifier for the first conversation. For example, the conversation identifier (e.g., a conversation container identifier 329 or a conversation identifier 330, FIG. 3A) is stored in a database (e.g., conversation database 262, FIG. 2) and is associated with a representation of the URL of the first website (e.g., a hash value 399 or other value computed by a hash function 398 of a URL of the website, FIG. 3D). This information is used to identify the created conversation with the webpage for which it was created. Thus, requests for a conversation associated with the webpage can be linked to the conversation that was created for the webpage by looking up the representation of the URL in the database that associates representations of URLs with conversation identifiers, as described in greater detail above with reference to FIG. 3D. Once the conversation identifier for the requested conversation has been determined, procedures related to the conversation (e.g., content updating, searching, indexing can be performed as described above).

Conversation server 130 sends (1216) information to the requesting client enabling the first conversation to be displayed as an element embedded in the first webpage (e.g., text data, image data, formatting data, etc.). The requesting client (e.g., the first client) receives (1218), in response to the first request, information enabling the first conversation to be displayed as an element embedded in the first webpage. The first conversation is a newly initialized conversation when the first webpage is rendered the first time. In some embodiments, when the first set of rendering instructions are executed for the first time, the first conversation is a newly created conversation. This newly created conversation is a blank document having an initial participant and optionally includes a subject, date stamp, predefined content, or other content added by the conversation server automatically, without user intervention, to the newly created conversation. It should be understood that the predefined content may include a portion of content from the webpage or other content specified by the administrator of the webpage (e.g., in the rendering instructions for the webpage that cause the first request to be generated). For example, the subject of the conversation could be defined by the administrator to include an identifier of the webpage (e.g., the conversation subject for www.example.com could be "Re: discussion of www.example.com.") However, any content in the newly initialized conversation will have been generated automatically by conversation server 130, as none of the participants have had a chance to add or modify content of the newly initialized conversation.

In some embodiments, the first conversation is displayed (1220) in the first webpage along with other content hosted at a server operated by a third party. In other words, in these embodiments, the other content comes from a webpage hosting company or servers operated by the webpage owner or other entity that is distinct from the conversation server. For example, in addition to the conversation that is hosted by conversation server 130, the webpage www.example.com includes content provided by the creator of www.example.com (e.g., a news story posted on www.example.com) and hosted at the webserver that is linked to the www.example.com URL.

In some embodiments, after sending the information to the first client and prior to receiving a second request (see 1228), conversation server 130 adds (1222) content to the conversation generated by a participant of the conversation (e.g., by a user of the first webpage or an administrator of the first webpage). In addition to being embedded in the webpage associated with the conversation, the conversation is also available directly through conversation server 130. Thus, a participant in the conversation that has a communications account with the conversation system to which conversation server 130 belongs may modify the conversation without visiting the webpage. For example, if Anne is a participant in the www.example.com conversation, Anne can log into a communications account, find the www.example.com conversation in her "inbox" and modify the conversation. In addition to notifying Anne when the new conversation has been created, Anne can subsequently stay up to date on the conversation without having to return to the website. In fact, Anne can be added to the conversation, read the conversation and modify the conversation without ever visiting the website with which the conversation is associated, and any comments that she adds to the conversation will be available to users who view the conversation on the website. This is particularly advantageous for users, such as administrators, who may need to monitor a large number of conversations, because it reduces the need to navigate to numerous different webpages to view the current comments in conversations associated with each of the webpages. Using some of the embodiments described herein, conversations for a plurality of different webpages may be presented in a conversation application associated with the communications account (e.g., in an "inbox") for such users. Additionally, comments added by such a user to the conversations that the user is monitoring in a conversation application associated with their communications account will also be reflected in the conversation embedded in the respective webpage (e.g., because the same hosted conversation is displayed on the webpage and in the conversation application).

In some circumstances, after rendering the first webpage for the first time by the first client, the first client renders (1224) the first webpage for a second time. The rendering includes executing the first set of rendering instructions that include sending to the conversation server a second request for a conversation associated with the first webpage. In other words, in these circumstances the same client that rendered the first webpage the first time renders the first webpage a second time. In other circumstances, after the first webpage has been rendered for the first time by the first client, a second client, distinct from the first client, renders (1226) the first webpage for a first time (or subsequent time). In either case, the first webpage is rendered after the conversation associated with the first webpage has already been generated. The rendering includes executing a first set of rendering instructions that include sending to the conversation server a second request for a conversation associated with the first webpage. In other words, in these circumstances, the second client renders the first webpage after the first webpage has already been rendered by a different client (e.g., the first client) for a first time.

In either case, after the first conversation has been generated, conversation server 130 receives (1228), from a client, a second request for a conversation associated with the first webpage. As discussed above, in some circumstances, the request is (1230) from the first client, while in other circumstances, the request is (1232) from the second client.

In some embodiments, when the second request for the conversation is received, the first conversation includes (1234) content generated by a participant of the conversation. In other words, one of the participants in the conversation added content to the conversation between the time that the first request was received (e.g., when the conversation was created) and the time the second request was received. For example, in response to the first request, a representation of the conversation is displayed embedded in a webpage and, prior to the second request being received by conversation server 130, the user of the first client adds a comment to the conversation from the webpage. As another example, after the representation of the conversation has been displayed embedded in the webpage at the first client, another participant adds content to the conversation through a conversation application associated with a communications account of the participant. In some embodiments, the first request and the second request each include (1236) same primary request content. Subsequently, the second request including the same primary request content is received (1238) by conversation server 130 each time the first webpage is rendered (e.g., the webpage has rendering instructions that, when executed, send an identical or similar request to the conversation server when any client renders the webpage, without regard to whether or not a conversation associated with the webpage has already been created). In some embodiments, conversation server 130 receives a plurality of respective requests from a plurality of clients when the first webpage is rendered at those clients, each respective request including the same primary request content.

However despite the fact that, in these embodiments, the first request and the second request include the same primary request content, in response to the first request a new conversation is generated, while in response to the second request a previously generated conversation is retrieved, as described in greater detail below. In many circumstances, it is advantageous to allow requests including the same primary request content to produce different responses at conversation server 130 depending on a presence or absence of a conversation at a conversation server. For example, an author of a webpage can use rendering instructions in a webpage that instruct the webpage to embed a conversation in the webpage without requiring the author of the webpage to ensure that a valid conversation is associated with the webpage or making sure that the conversation is properly referenced by the rendering instructions. Rather, the author of the webpage can insert generic rendering instructions which request a conversation, if a conversation is available and request the creation of a conversation if a conversation is not already available. In fact, such generic rendering instructions may even be included in a webpage template from which the webpage is generated.

This is particularly useful when the webpage author is creating many different webpages and wants to embed a conversation in each of the webpages, but does not want to spend the time to create a new conversation for each webpage before creating each webpage. Moreover, in some embodiments, the same rendering instructions can be used in multiple different webpages and the requests that are generated using the rendering instructions are differentiated by conversation server 130 in accordance with the referrer information of the request (e.g., the URL of the webpage being rendered at a respective client, or other information identifying the webpage, sometimes herein called HTTP referrer information). Thus, in these embodiments, an author of a plurality of different webpages can embed a conversation in each of the different webpages by adding the same generic rendering information to each of the webpages. For example, if the embedded conversations are being used as commenting on a plurality of news story webpages for a news website, the author of the webpages could add rendering instructions to each of the webpages that cause a distinct conversation to be created and subsequently retrieved for each of the webpages.

One example of rendering instructions, which when executed cause a request to be sent to conversation server 130 for a conversation associate with a webpage is provided below:

variable conversationPanel=new google.conversation. ConversationPanel({target: doc.getElementByLocID ("myConversationLocationIdentifier"), ownerAddress: "administrator@example.com", });

In this example, the client rendering the webpage will find the location (e.g., a particular display block, iFrame or other portion of the webpage into which the conversation is to be embedded) with the location identifier (LocID) "myConversationLocationIdentifier" and then send a request to conversation server 130 to generate and/or retrieve a conversation associated with the URL of the page that included the rendering instructions (e.g., www.example.com) and the specified owner (e.g., administrator@example.com). In this example, the requested conversation is identified by the URL of the webpage (www.example.com) and the location identifier (myConversationLocaltonIdentifier). Thus, if there are multiple conversations that are embedded in the same webpage, the requests for the conversations embedded in the same page are distinguished from each other by including an identifier (LocID) of the portion of the webpage into which the respective conversation is to be embedded. These conversation(s) will, however, only become available when the webpage is visited (i.e., rendered at a client) for the first time. It should be understood that typically this will happen when the author of the webpage automatically loads the webpage (e.g., when the author of the webpage enters data into a content management system that results into the webpage coming into existence), however it is possible that the author could create a webpage that is rendered for the first time by a client distinct from the author's client.

In some embodiments, the first conversation has a conversation identifier (e.g., conversation container identifier 329 and/or conversation identifier 330, FIG. 3A) generated in response to the first request, and in response to the second request, conversation server 130 accesses (1240) the first conversation using the conversation identifier for the first conversation (e.g., the URL of the first website is used to identify the conversation identifier and the conversation identifier is then be used to retrieve the first conversation, as described in greater detail above with reference to FIG. 3D).

In response to the second request, conversation server 130 sends (1242) information to the requesting client (e.g., the first client or the second client) enabling the first conversation to be displayed as an element embedded in the first webpage. The requesting client (e.g., the first client or the second client) receives (1244), in response to the second request, information enabling the first conversation to be displayed as an element embedded in the first webpage. In some circumstances (e.g., when content has been added to the first conversation by a participant), the first conversation includes participant generated content when the first webpage is rendered at the client that sent the second request (e.g., the first client or the second client). In other words, because the conversation returned in response to the second request is not a newly initialized conversation, it is possible that one or more participants have already modified the content of the conversation.

In some embodiments, after receiving the second request, the first conversation has (1246) a plurality of participants and the plurality of participants includes a user of the first client and a user of the second client. In some embodiments, the participants of the conversation include all of the visitors to the first webpage or all of the visitors to the webpage who have an communications account associated with the conversation system including conversation server 130 and interact with the embedded conversation on the webpage. As one example, the embedded conversation is being used as a comment section for the webpage (e.g., www.example.com) and a visitor to the webpage adds a comment to the conversation. In this example, when the visitor to the webpage has an communications account associated with the conversation system including conversation server 130 and is currently signed in to the communications account, the comment is added to the conversation associated with the webpage and the visitor to the webpage is identified as the author of the comment and is added to a participant list for the conversation. In contrast, when the visitor to the webpage either does not have an communications account associated with the conversation system including conversation server 130 or is not signed in to such an communications account, the comment is added to the conversation, but the visitor to the webpage is not added as a participant in the conversation. Optionally, the visitor is or is not identified as the author of the comment, depending on the implementation.

In some embodiments, a client (e.g., the first client or the second client) renders (1248) a second webpage for a first time. The rendering includes executing a first set of rendering instructions that include sending to a conversation server a request for a conversation associated with the second webpage, which is referred to as the "third request" below. In other words, the client renders a webpage that is different from the first webpage.

In some embodiments, the first request and the second request each include same primary request content and a first referral indicator, where the first referral indicator includes a representation of the URL of the first webpage. In some of these embodiments, conversation server 130 receives (1250) a third request from a third client for a conversation for display in a second webpage, where the third request includes the same primary request content and a second referral indicator that includes a representation of the URL of the second webpage (e.g., the third request is generated when a client renders the second webpage for the first time, as described above). In response to the third request, conversation server 130 identifies and sends (1252) information to the client enabling a second conversation distinct from the first conversation to be displayed as an element of the second webpage. The client that renders the second webpage receives (1254) information enabling a second conversation distinct from the first conversation to be displayed as an element of the second webpage at the client that renders the second webpage.

In other words, the first webpage is one of a plurality of webpages that each have the same rendering instructions that cause the first and second requests to be sent to the conversation server. For example, for a website that includes a plurality of webpages, each of the webpages may have the same rendering instructions for generating webpage specific conversations, and the conversation server uses an embedding page URL (e.g., HTTP referrer information) from the request to determine which conversation should be returned for a respective request. For example, a hash of the HTTP referrer information may be used to match the request with a particular conversation ID, as described in greater detail above with reference to FIG. 3D. This arrangement is particularly advantageous, because it enables a website creator to add the same rendering instructions to multiple different webpages in order to embed a different conversation in each webpage. For example, a webpage creator can use a template for creating a webpage that is part of a larger website (e.g., a webpage for a news story created from a template for news stories), where the template includes rendering instructions which, when executed generate a request to be sent to conversation server 130, the request including the same primary request content and an identifier of the webpage. Thus a website creator is able to save a substantial amount of time when creating multiple similar webpages, as compared with conventional methods.

Note that details of other processes described herein with respect to methods 500 or 1100 (e.g., FIGS. 5A-5E or 11A-11B, respectively) are also applicable in an analogous manner to method 1200 described above. For example, the conversation described above with reference to method 1200 may have one or more of the characteristics of the various conversations described herein with reference to methods 500 or 1100. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
at a conversation server having one or more processors and a memory storing one or more programs for execution by the one or more processors so as to perform the method:
receiving, from a client, a first request to generate a hosted conversation in accordance with a set of predefined parameters, wherein:
the client has a first user with a communications account associated with the conversation server; and
the set of predefined parameters is specified by a webpage that is not associated with the communications account;
in response to the first request, generating the hosted conversation in accordance with the set of predefined parameters, wherein the hosted conversation is hosted by the conversation server and has a plurality of participants including the first user and an automated participant that performs operations on behalf of a second user that is a non-subscribing user, the operations including an ability to remove text from the hosted conversation, the plurality of participants being specified by the predefined parameters;
receiving, from the first user of the client, an edit of content in the hosted conversation;
editing the hosted conversation by removing text that was previously present;
providing the client with a history of the hosted conversation using a history log of changes to the hosted conversation; and
sending, with the automated participant, a communication to the second user that includes an update of the hosted conversation based on the edit.

2. The method of claim 1, further comprising, sending, to the client, information enabling the client to display the hosted conversation.

3. The method of claim 1, wherein the communication is a first email sent to an email server and further comprising:
receiving a second email from the email server; and
updating, with the automated participant, the hosted conversation based on the second email.

4. The method of claim 1, wherein the plurality of participants include an administrator of a webpage from which the first request to generate the hosted conversation was received.

5. The method of claim 1, wherein:
the set of predefined parameters specify a portion of content from the webpage to be added to the hosted conversation;
generating the hosted conversation includes adding the portion of content to the hosted conversation; and
the method further comprises:
receiving a second request from the automated participant to modify the portion of content; and
in response to the second request from the automated participant, modifying the portion of content.

6. The method of claim 1, further comprising, after generating the hosted conversation, automatically, without user intervention, making the hosted conversation available to the plurality of participants of the hosted conversation.

7. The method of claim 6, wherein making the hosted conversation available to the plurality of participants includes enabling each of the participants in the plurality of participants to edit the hosted conversation.

8. The method of claim 1, wherein the set of predefined parameters specify an embedded application to be displayed in the hosted conversation, and the method further comprises inserting information into the hosted conversation enabling a user interface of the embedded application to be rendered in the hosted conversation.

9. A conversation server, comprising:
one or more processors;
a memory; and
one or more programs, wherein the one or more programs are stored in the memory and configured to be executed by the one or more processors, the one or more programs including instructions for:
receiving, from a client, a first request to generate a hosted conversation in accordance with a set of predefined parameters, wherein:
the client has a first user with a communications account associated with the conversation server; and
the set of predefined parameters is specified by a webpage that is not associated with the communications account;
in response to the first request, generating the hosted conversation in accordance with the set of predefined parameters, wherein the hosted conversation is hosted by the conversation server and has a plurality of participants including the first user and an automated participant that performs operations on behalf of a second user that is a non-subscribing user, the operations including an ability to remove text from the hosted conversation, the plurality of participants being specified by the predefined parameters;
receiving, from the first user of the client, an edit of content in the hosted conversation;
editing the hosted conversation by removing text that was previously present;
providing the client with a history of the hosted conversation using a history log of changes to the hosted conversation; and
sending, with the automated participant, a communication to the second user that includes an update of the hosted conversation based on the edit.

10. The conversation server of claim 9, further comprising instructions for sending, to the client, information enabling the client to display the hosted conversation.

11. The conversation server of claim 9, wherein:
the set of predefined parameters specify a portion of content from the webpage to be added to the hosted conversation;
generating the hosted conversation includes adding the portion of content to the hosted conversation; and
the conversation server further comprises instructions for:
receiving a second request from the automated participant to modify the portion of content; and
in response to the second request from the automated participant, modifying the portion of content.

12. The conversation server of claim 9, further comprising instructions for, after generating the hosted conversation, automatically, without user intervention, making the hosted conversation available to the plurality of participants of the hosted conversation.

13. The conversation server of claim 12, wherein making the hosted conversation available to the plurality of participants includes enabling each of the participants in the plurality of participants to edit the hosted conversation.

14. The conversation server of claim 9, wherein the set of predefined parameters specify an embedded application to be displayed in the hosted conversation, and the computer system further comprises instructions for inserting information into the hosted conversation enabling a user interface of the embedded application to be rendered in the hosted conversation.

15. A non-transitory computer readable storage medium and one or more computer programs embedded therein, the one or more computer programs comprising instructions, which when executed by a conversation server, cause the conversation server to:
receive, from a client, a first request to generate a hosted conversation in accordance with a set of predefined parameters, wherein:
the client has a first user with a communications account associated with the conversation server; and
the set of predefined parameters is specified by a webpage that is not associated with the communications account;
in response to the first request, generate the hosted conversation in accordance with the set of predefined parameters, wherein the hosted conversation is hosted by the conversation server and has a plurality of participants including the first user and an automated participant that performs operations on behalf of a second user that is a non-subscribing user, the operations including an ability to remove text from the hosted conversation, the plurality of participants being specified by the predefined parameters;
receive, from the first user of the client, an edit of content in the hosted conversation;
edit the hosted conversation by removing text that was previously present;
provide the client with a history of the hosted conversation using a history log of changes to the hosted conversation; and
send, with the automated participant, a communication to the second user that includes an update of the hosted conversation based on the edit.

16. The computer readable storage medium of claim 15, further comprising instructions to send, to the client, information enabling the client to display the hosted conversation.

17. The computer readable storage medium of claim 15, wherein:
the set of predefined parameters specify a portion of content from the webpage to be added to the hosted conversation;
generating the hosted conversation includes adding the portion of content to the hosted conversation; and
the computer readable storage medium further comprises instructions to:
receive a second request from the automated participant to modify the portion of content; and
in response to the second request from the automated participant, modify the portion of content.

18. The computer readable storage medium of claim 15, further comprising instructions to, after generating the hosted conversation, automatically, without user intervention, make the hosted conversation available to the plurality of participants of the hosted conversation.

19. The computer readable storage medium of claim 18, wherein making the hosted conversation available to the plurality of participants includes enabling each of the participants in the plurality of participants to edit the hosted conversation.

20. The computer readable storage medium of claim 15, wherein the set of predefined parameters specify an embedded application to be displayed in the hosted conversation, and the computer system further comprises instructions to insert information into the hosted conversation enabling a user interface of the embedded application to be rendered in the hosted conversation.

\* \* \* \* \*